United States Patent
Schantz et al.

(10) Patent No.: US 8,643,538 B2
(45) Date of Patent: *Feb. 4, 2014

(54) NEAR FIELD ELECTROMAGNETIC LOCATION SYSTEM AND METHOD

(75) Inventors: Hans Gregory Schantz, Huntsville, AL (US); Robert Edward DePierre, Huntsville, AL (US); David Wesley Langford, Madison, AL (US)

(73) Assignee: Q-Track Corporation, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/977,067

(22) Filed: Dec. 23, 2010

(65) Prior Publication Data

US 2011/0148714 A1   Jun. 23, 2011

Related U.S. Application Data

(60) Continuation of application No. 12/563,960, filed on Sep. 21, 2009, now Pat. No. 7,859,452, which is a division of application No. 11/986,319, filed on Nov. 19, 2007, now Pat. No. 7,592,949, which is a division of application No. 10/958,165, filed on Oct. 4, 2004, now Pat. No. 7,298,314, which is a continuation-in-part of application No. 10/355,612, filed on Jan. 31, 2003, now Pat. No. 6,963,301.

(60) Provisional application No. 60/562,413, filed on Apr. 15, 2004, provisional application No. 60/404,602, filed on Aug. 19, 2002, provisional application No. 60/404,604, filed on Aug. 19, 2002.

(51) Int. Cl.
*G01S 11/00* (2006.01)
*G01S 13/84* (2006.01)

(52) U.S. Cl.
USPC .......................... 342/125; 342/118; 342/127

(58) Field of Classification Search
USPC .......................................... 342/118, 125, 127
See application file for complete search history.

(56) References Cited

U.S. PATENT DOCUMENTS

| | | | |
|---|---|---|---|
| 1,828,531 A | 10/1931 | Gage | 342/407 |
| 2,422,107 A | 6/1947 | Luck et al. | 342/434 |

(Continued)

FOREIGN PATENT DOCUMENTS

| | | |
|---|---|---|
| EP | 0581434 | 2/1994 |
| EP | 1226729 A1 | 7/2002 |
| WO | WO 88/09515 | 12/1988 |

OTHER PUBLICATIONS

Kanda, M., "An Electromagnetic Near-Field Sensor for Simultaneous Electric and Magnetic Field Measurements", IEEE Transactions on Electromagnetic Compatability, vol. EMC-26, No. 3, Aug. 1984.*

(Continued)

*Primary Examiner* — Ian J Lobo
(74) *Attorney, Agent, or Firm* — James Richards

(57) ABSTRACT

A system and method for determining a position of a locus comprising a locator device for disposition at the locus; the locator device configured for receiving an electromagnetic signal from a beacon device, the locator device receiving at a distance from the beacon device within near field range of the electromagnetic signal; the locator device configured for distinguishing at least two characteristics of the electromagnetic signal sensed at the locus; the system employing the at least two characteristics to effect the determining of the position of the locus.

33 Claims, 21 Drawing Sheets

(56) References Cited

U.S. PATENT DOCUMENTS

| | | | | |
|---|---|---|---|---|
| 2,884,628 | A | | 4/1959 | Loomis .................. 342/388 |
| 2,955,778 | A | | 10/1960 | Beverage .............. 324/71.1 |
| 3,046,549 | A | | 7/1962 | Kalmus .................. 342/385 |
| 3,121,228 | A | | 2/1964 | Kalmus .................. 342/448 |
| 3,526,886 | A | | 9/1970 | Lubich ............... 324/207.17 |
| 3,644,825 | A | | 2/1972 | Davis, Jr. et al. ...... 324/207.26 |
| 3,868,565 | A | | 2/1975 | Kuipers ............. 324/207.26 |
| 3,983,474 | A | | 9/1976 | Kuipers ............. 324/207.18 |
| 4,054,881 | A | * | 10/1977 | Raab .................. 342/448 |
| 4,314,251 | A | | 2/1982 | Raab .................. 342/463 |
| 4,721,961 | A | | 1/1988 | Busignies et al. ...... 342/458 |
| 4,808,923 | A | | 2/1989 | Posseme ............. 324/207.17 |
| 5,218,301 | A | * | 6/1993 | Kuckes ............... 324/368 |
| 5,307,072 | A | | 4/1994 | Jones .................. 342/147 |
| 5,510,801 | A | | 4/1996 | Engelbrecht et al. .......... 342/457 |
| 5,602,903 | A | | 2/1997 | LeBlanc et al. ............ 455/456.2 |
| 5,809,063 | A | | 9/1998 | Ashe .................. 375/141 |
| 5,977,913 | A | | 11/1999 | Christ .................. 342/465 |
| 6,011,515 | A | | 1/2000 | Radcliffe et al. ........... 342/453 |
| 6,026,304 | A | | 2/2000 | Hilsenrath et al. ........ 455/456.2 |
| 6,108,557 | A | | 8/2000 | Wax et al. .............. 455/456.2 |
| 6,154,657 | A | | 11/2000 | Grubeck et al. .......... 455/456.2 |
| 6,249,680 | B1 | | 6/2001 | Wax et al. .............. 455/456.2 |
| 6,282,426 | B1 | | 8/2001 | Wang .................. 455/456.2 |
| 6,456,239 | B1 | | 9/2002 | Werb et al. .............. 342/463 |
| 6,496,701 | B1 | | 12/2002 | Chen et al. ............. 455/456.5 |
| 6,559,800 | B2 | | 5/2003 | Rabinowitz et al. ........ 342/457 |
| 6,608,593 | B2 | | 8/2003 | Holt .................... 342/453 |
| 6,674,403 | B2 | | 1/2004 | Gray et al. .............. 342/463 |
| 6,691,074 | B1 | | 2/2004 | Moriya et al. ............ 702/190 |
| 6,727,847 | B2 | | 4/2004 | Rabinowitz et al. ....... 342/357.29 |
| 6,762,721 | B2 | | 7/2004 | Halsey et al. ............ 342/442 |
| 6,879,286 | B2 | | 4/2005 | Rabinowitz et al. ........ 342/458 |
| 6,963,727 | B2 | | 11/2005 | Shreve .................. 455/39 |
| 7,043,999 | B2 | | 5/2006 | Bernhard et al. ........... 73/801 |
| 7,096,728 | B2 | | 8/2006 | Anderson et al. ......... 702/134 |
| 7,593,740 | B2 | | 9/2009 | Crowley et al. .......... 455/456.3 |
| 7,609,164 | B2 | | 10/2009 | Yamashita ............. 340/572.7 |
| 7,782,256 | B2 | | 8/2010 | Smith .................. 342/453 |
| 7,809,805 | B2 | | 10/2010 | Stremel et al. ........... 709/219 |
| 7,835,779 | B2 | | 11/2010 | Anderson et al. ......... 600/407 |
| 2009/0146864 | A1 | | 6/2009 | Zank et al. .............. 342/22 |

OTHER PUBLICATIONS

Jonathan McElroy et al, "Opportunistic navigation: finding your way with AM signals of opportunity," GPS World, Jul. 2007, pp. 44-49.

T.D. Hall, "Radiolocation Using AM Broadcast Signals: The Role of Signal Propagation Irregularities," Position Location and Navigation Symposium, 2004 pp. 752-761.

Chunpeng Yan and H. Howard Fan, "Asynchronous Differential TDOA for Non-GPS Navigation Using Signals of Opportunity," IEEE International Conference on Acoustics, Speech, and Signal Processing, Mar. 31-Apr. 4, 2008 (ICASSP 2008), pp. 5312-5315.

Heinrich Hertz, Electric Waves, London: Macmillan and Company, 1893, p. 152.

Herndon H. Jenkins, Small-Aperture Radio Direction-Finding, Artech House, Boston; 1991; pp. 1-23.

H. Schantz, "Near field propagation law & a novel fundamental limit to antenna gain versus size," 2005 IEEE Antennas and Propagation Society International Symposium, vol. 3B, Jul. 3-8, 2005, pp. 134-137.

H. Schantz, "Near field phase behavior," 2005 IEEE Antennas and Propagation Society International Symposium, vol. 3A, Jul. 3-8, 2005, pp. 237-240.

Matthew Reynolds, "A Phase Measurement Radio Positioning System for Indoor Use," Masters Thesis, M.I.T., Feb. 1999. http://www.media.mit.edu/physics/publications/theses/99.02.reynolds.pdf.

Matthew Reynolds, "Low Frequency Indoor Radio Navigation," Doctoral Dissertation, M.I.T., Feb. 2003. http://www.media.mit.edu/physics/publications/theses/03.02.reynolds.pdf.

Kalmus, "A new guiding and tracking system," IRE Transactions on Aerospace and Navigational Electronics, Mar. 1962, vol. ANE-9, Issue 12, pp. 7-10.

Raab, "Quasistatic magnetic-field technique for determining position and orientation," IEEE Transactions on Geoscience and Remote Sensing, vol. GE-19, Issue 4, Oct. 1981, pp. 235-245.

Raab et al, "Magnetic position and orientation tracking system," IEEE Transactions on Aerospace and Electronic Systems, vol. AES-15 No. 5, Sep. 1979, pp. 709-717.

Kemp el al "A new technique for the analysis of transient ELF electromagnetic disturbances within the Earth-ionosphere cavity," Journal of Atmospheric and Terrestrial Physics, 1971, vol. 33, pp. 567-572.

Martin, E. "Multimode Radio Fingerprinting for Localization" University of California, Berkeley, CA., IEEE Radio and Wireless Symposium, 2011.

Kenneth A. Fisher, "The navigation potential of signals of opportunity-based time difference of arrival measurements," Ph.D. Dissertation, Air Force Institute of Technology, 2002. See: http://handle.dtic.mil/100.2/ADA442340 or http://www.stormingmedia.us/04/0432/A043244.html.

\* cited by examiner

| Fractions of Wavelengths (ft) | | | | |
|---|---|---|---|---|
| f (kHz) | 0.05λ | 0.08λ | 0.30λ | 0.50λ |
| *160* | 307.4 | 491.9 | 1844.6 | 3074.3 |
| *190* | 258.9 | 414.2 | 1553.3 | 2588.9 |
| 510 | 96.4 | 154.3 | 578.7 | 964.5 |
| 600 | 82.0 | 131.2 | 491.9 | 819.8 |
| 800 | 61.5 | 98.4 | 368.9 | 614.9 |
| 1000 | 49.2 | 78.7 | 295.1 | 491.9 |
| 1200 | 41.0 | 65.6 | 245.9 | 409.9 |
| 1400 | 35.1 | 56.2 | 210.8 | 351.3 |
| 1600 | 30.7 | 49.2 | 184.5 | 307.4 |
| 1705 | 28.8 | 46.2 | 173.1 | 288.5 |
| *10700* | *4.6* | *7.4* | *27.6* | *46.0* |
| 13560 | 3.6 | 5.8 | 21.8 | 36.3 |
| 27120 | 1.8 | 2.9 | 10.9 | 18.1 |
| 40680 | 1.2 | 1.9 | 7.3 | 12.1 |

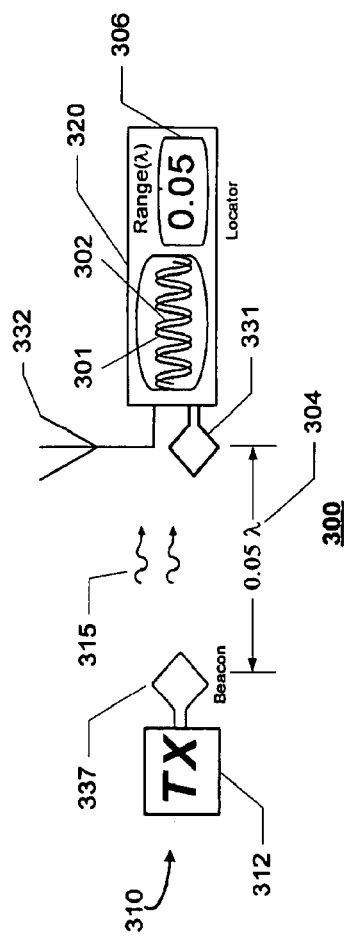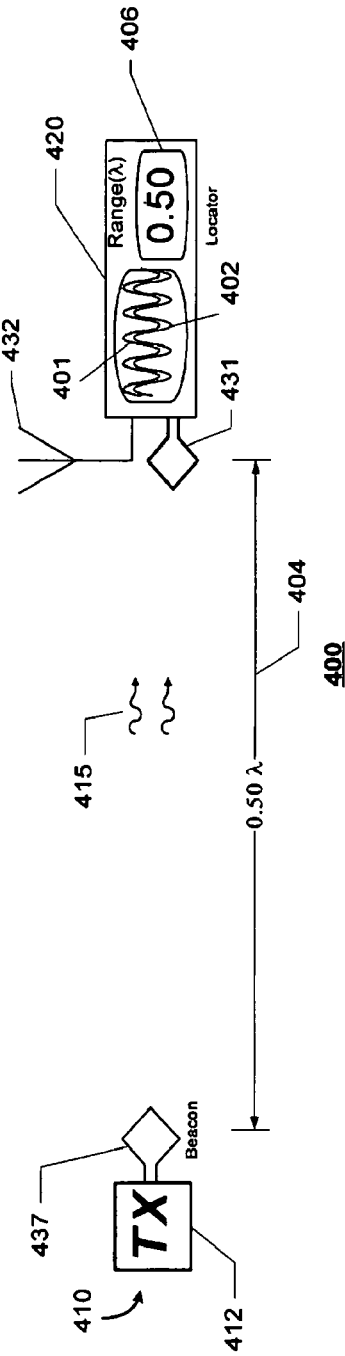

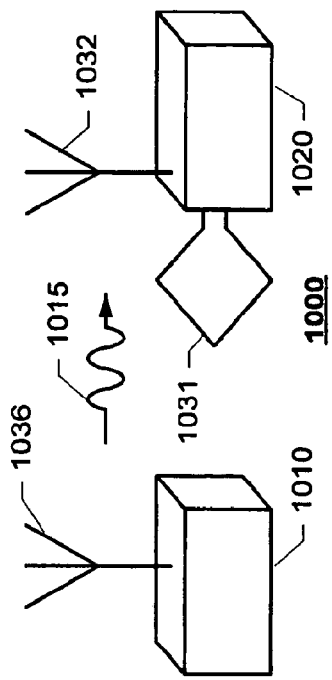
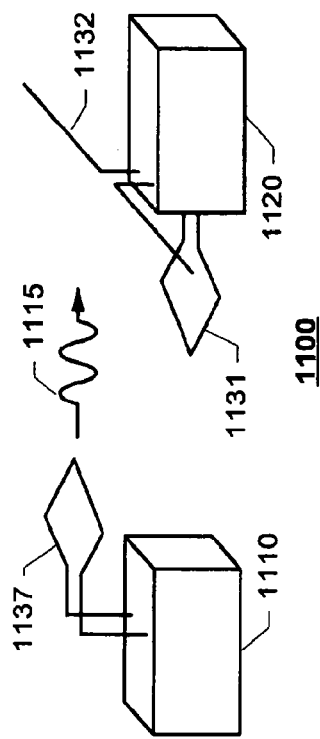
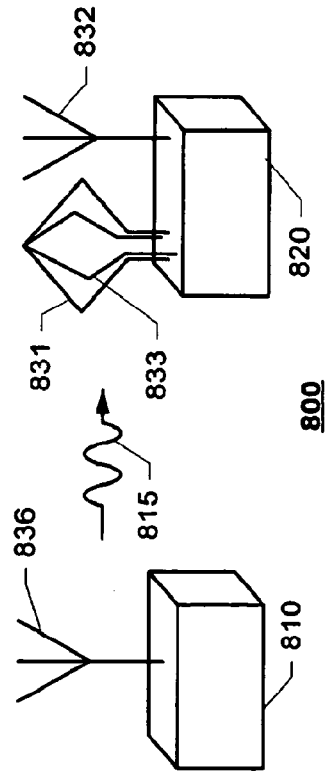
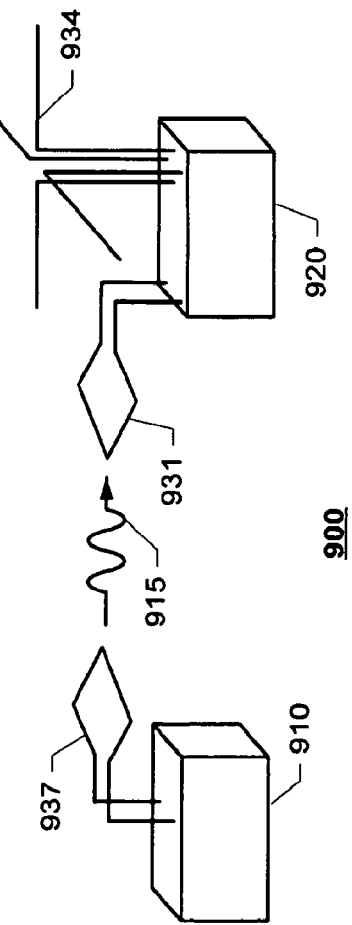
FIG. 10
FIG. 11
FIG. 8
FIG. 9

NEAR FIELD ELECTROMAGNETIC LOCATION SYSTEM AND METHOD

The present application is a Continuation of U.S. patent application Ser. No. 12/563,960, Titled: "Near Field Electromagnetic Positioning Calibration System", filed Sep. 21, 2009 by Schantz et al, which is a divisional of U.S. patent application Ser. No. 11/986,319, titled "Near Field Electromagnetic Positioning Calibration System and Method" filed Nov. 19, 2007 by Schantz et al, which is a Divisional of U.S. patent application Ser. No. 10/958,165, titled "Near Field Electromagnetic Positioning System and Method", filed Oct. 4, 2004, by Schantz et al., which is a continuation-in-part of U.S. Patent Application Titled: "System and Method for Near-Field Electromagnetic Ranging," filed Jan. 31, 2003, Ser. No. 10/355,612, published as Pub. No. US 2004/0032363 A1, by Schantz et al, which claims the benefit of Provisional US Patent Application Titled "System and Method for Electromagnetic Ranging," filed Aug. 19, 2002, Ser. No. 60/404,602, by Schantz et al, and US Provisional Patent Application titled: "System and Method for Electromagnetic Ranging," filed Aug. 19, 2002, Ser. No. 60/404,604, by Schantz et al; application Ser. No. 10/958,165 further claims benefit of US Provisional Patent Application titled: "Near Field Electromagnetic Ranging Calibration System and Method", filed Apr. 15, 2004, Ser. No. 60/562,413, by Schantz; all of which are incorporated herein by reference.

BACKGROUND OF THE INVENTION

1. Field of the Invention

The present invention relates generally to the measurement of position or location by means of electromagnetic signaling and more particularly to position measurement utilizing near field signals in conjunction with a calibration process.

2. Related Art

Radio frequency (RF) techniques have been proposed to solve many ranging and position measuring problems in industry. For example, significant cost reduction is possible if inventories could be automatically tracked in a warehouse. Hospitals need to know the location of resources such as wheel chairs, gurneys, and diagnostic equipment for speedy retrieval when needed and for cost efficient operations. Hotels and resorts need to know the location of resources such as projectors, lawn mowers, golf carts, etc. Position information could inform a security system keeping track of inventories in a retail establishment and guarding against theft. Position information is critical to the national 911 system to enable first responders to know instantly the location of a call to 911 from a person in distress.

Accurate, affordable position information however has been elusive. A principal source of difficulty arises from the fact that typical environments are not ideal. Outdoors, typical environments contain objects such as trees, hills, buildings, cars and such that disrupt ideal planar uniform behavior. Similarly inside, objects such as walls, studs, pipes, desks, filing cabinets, and lights tend to attenuate or block signals as well as generate multi-path reflections. In both cases, real world environments have complicated behaviors that defy exact reliable predictions.

A variety of prior art seeks to overcome complicated propagation environments by mapping a signal characteristic corresponding to particular locations of interest. These techniques are sometimes collectively referred to as "RF fingerprinting." The motivation behind these techniques is the hope that a sufficiently accurate map can be made to uniquely identify a particular transmit position in the same way a human fingerprint serves to uniquely identify a particular person.

One RF fingerprinting approach is to deploy a network of sensors throughout an area in which one desires to track personnel or assets. Received signal strengths at each sensor may be compared to calibration, reference or experimental data to determine which previously measured location yields the best fit to a currently received signal. Christ (U.S. Pat. No. 5,977,913) uses this technique to localize personnel and Gray et al (U.S. Pat. No. 6,674,403) use this technique to track wireless devices. However, positioning based on relative signal strength is notoriously inaccurate. Network signal strength measurements may serve to localize a transmitter to a particular zone, but usually require at least one sensor per zone. This often makes it uneconomical to achieve high precision positioning. Also, the propagation environment may change significantly based on the presence of people, goods, or other transient objects that may not have been present or may have been in different positions at the time a calibration was performed.

An alternate RF fingerprinting technique attempts to use multi-path signals arriving at an antenna array to localize a transmitter. Multipath signals arriving at the antenna array are compared to a database of calibrated multipath signal signatures and corresponding locations. The location whose calibrated signal signature best matches the measured signature is selected as the most likely transmitter location. Hilsenrath (U.S. Pat. No. 6,026,304) suggested this technique in conjunction with a system to localize cellular phone transmissions. More sophisticated techniques for signature matching were taught by Wax et al (U.S. Pat. Nos. 6,064,339; 6,104,344; 6,108,557; 6,112,095). These techniques may be used to make more economical assignments of cellular subscribers to base stations as taught by Grubeck et al (U.S. Pat. No. 6,154,657), or applied to CDMA systems as taught by Wax et al (U.S. Pat. No. 6,249,680). Furthermore, Wang et al (U.S. Pat. No. 6,282,426) teach using time of arrival signals and simulated ray tracing. All of these techniques rely on the hope that the multi-path environment will be sufficiently stable and static to be repeatable.

Chen et al (U.S. Pat. No. 6,496,701) teach a system in which the geographical location of a mobile terminal is identified by comparing characteristics such as pilot strength and chip offset from the mobile terminal with the same attributes for a variety of sub-cells and determining which sub-cell most closely matches the observed set of RF characteristics. Werb et al (U.S. Pat. No. 6,456,239) teach user selectable configuration packages in conjunction with a system for determining location of a tag using stored data. Moriya et al (U.S. Pat. No. 6,691,074) teach using accelerometers and Kalman filtering to supplement electromagnetic position measurements.

Finally, there is a body of prior art involving signals conveyed on a transmission line such as a telegraphy line or a power line. Edison (U.S. Pat. No. 162,633) taught an apparatus for duplex telegraphy in which direction of current yields one signal channel and increase or decrease of current yields another.

Thus, there is a need for a low cost method for range determination that may be used in complex RF propagation environments such as in and around buildings or over rough terrain and yet provide accurate, reliable results.

BRIEF SUMMARY OF THE INVENTION

Briefly, the present invention relates to a system for determining a position of a locus comprising a locator device for disposition at the locus; the locator device configured for receiving an electromagnetic signal from a beacon device, the locator device receiving at a distance from the beacon device within near field range of the electromagnetic signal; the locator device configured for distinguishing at least two characteristics of the electromagnetic signal sensed at the locus; the system employing the at least two characteristics to effect the determining of the position of the locus.

In one embodiment the at least two characteristics of the electromagnetic signal may be a first characteristic related to an electric field component of the electromagnetic signal and a second characteristic related to a magnetic field component of the electromagnetic signal.

In a further embodiment, the first characteristic is electric field phase and the second characteristic is magnetic field phase.

In a further embodiment, the locator device effects the measuring by measuring a phase difference between the at least two characteristics of the electromagnetic signal and employing the phase difference to effect the measuring.

In a further embodiment, the locator device effects the determining by measuring an amplitude difference between the at least two characteristics of the electromagnetic signal and employs the amplitude difference to effect the determining.

In a further embodiment, the beacon device is a mobile source of electromagnetic radiation.

In a further embodiment, the beacon device operates from a fixed position.

In a further embodiment, the beacon device is an uncooperative source of electromagnetic radiation.

In another embodiment, further including a data link and a central controller, the locator device conveys information relating to the at least two characteristics to the central controller using the data link.

In another embodiment, further including a data link and a central controller, the central controller conveys information to the locator device using the data link.

In a further embodiment, the locator device is configured to be carried by a user and provide the user with location specific information.

In a further embodiment, the location specific information relates to a nearby object.

In a further embodiment, the nearby object is for sale, for review, or for evaluation.

In a further embodiment, the location specific information relates to a price for the nearby object.

In a further embodiment, the location specific information is descriptive information for the nearby object.

The invention may also include associated methods:

A method for measuring distance between a first locus and a second locus, the method comprising the steps of:

(a) a receiving system receiving an electromagnetic signal at the second locus, the electromagnetic signal transmitted from the first locus, the second locus being within near field range of the electromagnetic signal from the first locus; in no particular order:

(1) the receiving system detecting a first characteristic of the electromagnetic signal received at the second locus; and (2) the receiving system detecting a second characteristic of the electromagnetic signal received at the second locus;

(b) the receiving system comparing the first characteristic and the second characteristic to produce a comparison; and (c) the receiving system employing the comparison to calculate the distance.

In a further embodiment, the method may include wherein the receiving system is physically distributed and the step of employing the comparison to calculate the distance is located at a third locus separate from the second locus.

In a further embodiment, the method may include: wherein the first characteristic is related to an electric field component of the electromagnetic signal and the second characteristic is related to a magnetic field component of the electromagnetic signal.

In a further embodiment, the method may include: wherein the first characteristic is electric field phase and the second characteristic is magnetic field phase.

In a further embodiment, the method may include: wherein the locator device effects the measuring by measuring a phase difference between the first characteristic of the electromagnetic signal and the second characteristic of the electromagnetic signal and employing the phase difference to effect the measuring.

In one embodiment, the present invention relates to a system and method for determining position by utilizing electromagnetic signaling in conjunction with a calibration process.

For calibration, a mobile transmitter generates one or more beacon signals at a plurality of transmitter locations, the beacon signal for each respective transmitter location is received at a plurality of receiver locations, and a comparison unit determines and records a comparison between two or more signal characteristics for each receiver location, for each respective transmitter location. A database including calibration data set is generated comprising the receiver signal characteristics.

For position determination, a transmitter located at the position to be determined transmits one or more beacon signals. A plurality of receivers receive one or more beacon signals. A comparison between at least two signal characteristics is determined for each receiver location. A locator data set is generated comprising the receiver signal characteristics. A control processor compares the locator data set with the calibration data set to determine position.

In one embodiment, the comparison between two or more signal characteristics is the difference between E field phase and H field phase. In an alternate embodiment, the comparison is the difference between E field magnitude and H field magnitude. It is a feature of the invention that the E field and H field signal characteristic differences are particularly useful in the near field.

Comparing data sets may include matching using a vector difference magnitude criteria. Interpolation or extrapolation may be employed to refine the match. One embodiment employs a Laplace algorithm for extrapolation to unmeasured data points.

In another embodiment, calibration is achieved wherein one or more receivers receive multiple beacon signals at multiple receiver locations from a plurality of transmitters. A calibration data set is generated comprising receiver measurements.

In yet another embodiment, position is determined wherein a receiver at a position to be determined receives multiple beacon signals from one or more transmitters at one or more respective transmitter locations. A locator data set is generated comprising the receiver signal characteristics. The locator data set is compared with the calibration data set to determine the position of the receiver.

A further method is disclosed for determining position by utilizing signals available from existing installed wiring such as power wiring.

Embodiments are also disclosed for a personal locator wherein an antenna is embedded in a lanyard such as are often used for holding identification badges or cards. This personal locator architecture is well suited for a low frequency personal location system.

Further features and benefits of the present invention will be apparent from the following specification and claims when considered in connection with the accompanying drawings illustrating the preferred embodiments of the invention Like elements are labeled using like reference numerals in the various figures.

BRIEF DESCRIPTION OF THE DRAWINGS

FIG. 2 is a table relating range of operation and frequency for a near-field ranging system.

FIG. 3 is a schematic illustration of a system for near-field ranging by comparison of electric and magnetic field phase in quadrature.

FIG. 4 is a schematic illustration of a system for near-field ranging by comparison of electric and magnetic field phase in phase synchrony.

FIG. 8 is a schematic illustration of a representative antenna configuration for a near-field ranging system having a vertical polarization beacon and a vertical polarization omni-directional locator.

FIG. 9 is a schematic illustration of a representative antenna configuration for a near-field ranging system having a horizontal polarization beacon and a horizontal polarization omni-directional locator.

FIG. 10 is a schematic illustration of a representative antenna configuration for a near-field ranging system having a vertical polarization beacon and a vertical polarization directional locator.

FIG. 11 is a schematic illustration of a representative antenna configuration for a near-field ranging system having a horizontal polarization beacon and a horizontal polarization directional locator.

DETAILED DESCRIPTION OF THE PREFERRED EMBODIMENTS

Figure 1:
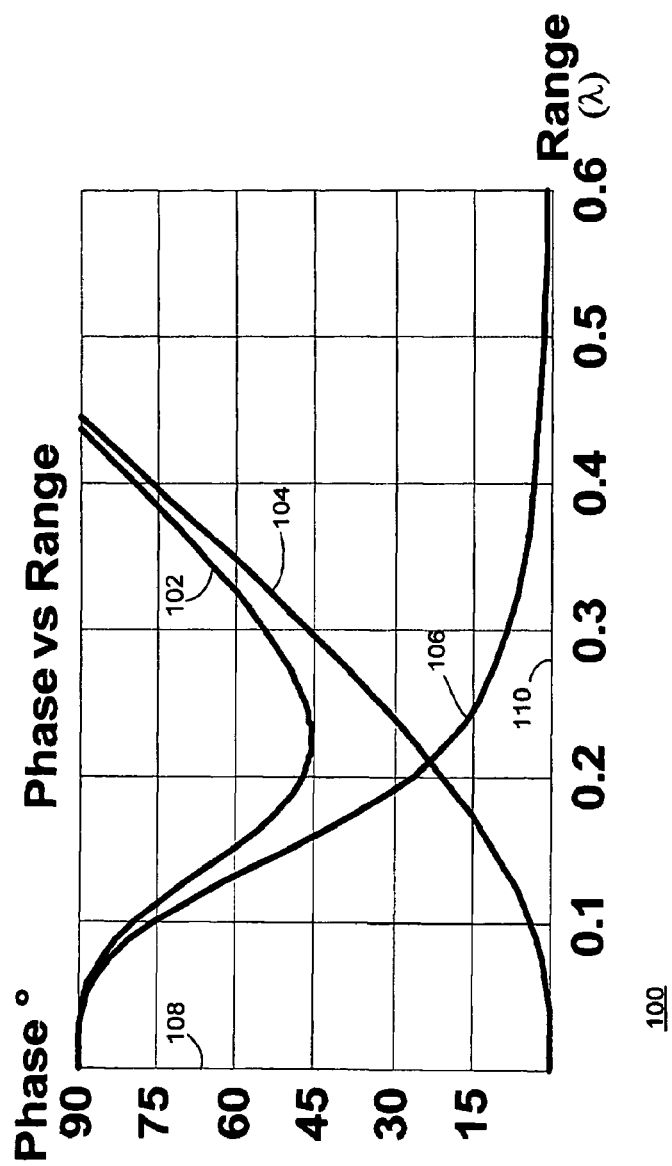
FIG. 1 is a graphic representation of electric and magnetic field phase relationships as a function of range for an ideal electrically small loop in free space.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art.

Overview of the Invention

The present invention is directed to a system and method for determining position using a near field electromagnetic ranging system. The system and method may include the use of calibration information provided by field measurements. Near field electromagnetic ranging was first fully described in applicant's co-pending "System and Method for Near Field Electromagnetic Ranging," Filed Jan. 31, 2003, Ser. No. 10/355,612, published as Pub. No. US 2004/0032363 A1, to Schantz et al, This document has been incorporated herein by reference.

An Analytic Model

Suppose a transmit-only target uses a small loop antenna that behaves like a time domain magnetic dipole. A magnetic dipole may be thought of as a small current loop of area A, and a time dependent current $I=I_0 T(t)$ where $I_0$ is an initial or characteristic current and $T(t)$ is the time dependence. Assume the dipole lies in the x-y plane centered at the origin with its axis in the z direction. The dipole's magnetic moment m is: $m=A\ I_0\ T(t)$, or $m=m_0\ T(t)$. The magnetic field or "H-field" of this small loop is:

$$H(t) = \frac{m_0}{4\pi r^2}\left(\frac{T}{r} + \frac{\dot{T}}{c}\right)(2\cos\theta\hat{r} + \sin\theta\hat{\theta}) + \frac{m_0\ddot{T}\sin\theta}{4\pi c^2 r}\hat{\theta}, \quad [2]$$

and the electric field or "E-field" is:

$$E(t) = -\frac{1}{4\pi\varepsilon_0}\frac{m}{c^2 r}\left(\frac{\dot{T}}{r} + \frac{\ddot{T}}{c}\right)\sin\theta\hat{\varphi}, \quad [3]$$

where r is the range from the origin, c is the speed of light, $\varepsilon_0$ is the permeability of free space, and derivatives with respect to time are denoted by dots. Assume a sinusoidal excitation $T(t)=\sin\omega t$ where $\omega$ is the angular frequency: $\omega=2\pi f$. Then, $\dot{T}(t)=\omega \cos\omega t$, $\ddot{T}(t)=-\omega^2 \sin\omega t$, $$H(t) = \frac{m_0}{4\pi r^2}\left(\frac{\sin\omega t}{r} + \frac{\omega\cos\omega t}{c}\right)(2\cos\theta\hat{r} + \sin\theta\hat{\theta}) - \frac{m_0\omega^2\sin\omega t \sin\theta}{4\pi c^2 r}\hat{\theta}, \quad [4]$$

and:

$$E(t) = -\frac{1}{4\pi\varepsilon_0}\frac{m_0}{c^2 r}\left(\frac{\omega}{r}\cos\omega t - \frac{\omega^2}{c}\sin\omega t\right)\sin\theta\hat{\varphi}. \quad [5]$$

There are a variety of ways in which range information may be obtained from near-fields. For instance, one could compare a longitudinal or radial ($\hat{r}$) component of a first field to a transverse component ($\hat{\theta}$ or $\hat{\varphi}$) of a first field. One could compare a longitudinal or radial ($\hat{r}$) component of a first field to a transverse component ($\hat{\theta}$ or $\hat{\varphi}$) of a second field. One could compare a longitudinal or radial ($\hat{r}$) component of a first field to a longitudinal or radial ($\hat{r}$) component of a first field. One could compare a longitudinal or radial ($\hat{r}$) component of a first field to a longitudinal or radial ($\hat{r}$) component of a second field. One could compare a transverse component ($\hat{\theta}$ or $\hat{\varphi}$) of a first field to a transverse component ($\hat{\theta}$ or $\hat{\varphi}$) of a first field. One could compare a transverse component ($\hat{\theta}$ or $\hat{\varphi}$) of a first field to a transverse component ($\hat{\theta}$ or $\hat{\varphi}$) of a second field. These comparisons may include comparisons of phase, comparisons of amplitude, or comparisons of other signal properties.

The inventors have discovered that one particularly advantageous and useful comparison is a comparison of phase of an electric component of an electromagnetic wave to phase of a magnetic component of an electromagnetic wave.

For this ideal small loop in free space, E-field phase in degrees as a function of range is:

$$\phi_E = \frac{180}{\pi}\left(\frac{\omega r}{c} + \cot^{-1}\frac{\omega r}{c}\right). \quad [6]$$

Transverse H-field phase in degrees as a function of range is:

$$\phi_H = \frac{180}{\pi}\left(\frac{\omega r}{c} + \cot^{-1}\left(\frac{\omega r}{c} - \frac{c}{\omega r}\right)\right). \quad [7]$$

Note that Equation (6) has a branch cut at a range $$r = \frac{1}{2\pi}\lambda.$$

The phase delta is given by:

$$\Delta_\phi = \phi_H - \phi_E = \frac{180}{\pi}\left(\cot^{-1}\left(\frac{\omega r}{c} - \frac{c}{\omega r}\right) - \cot^{-1}\frac{\omega r}{c}\right). \quad [8]$$

These relations assume a measurement in the plane of the loop ($\theta=90°$). Similar relations may be derived for other orientations.

FIG. 1 is a graphic representation of electric and magnetic field phase relationships as a function of range for an ideal electrically small loop in free space. In FIG. 1, a graphic plot 100 includes a magnetic or H-Field phase curve 102, an electric or E-Field phase curve 104 and a phase difference or $\Delta\phi$ curve 106 representing the difference between curves 102, 104. Curves 102, 104, 106 are plotted against a first axis 108 representing phase (preferably in degrees) as a function of range represented on a second axis 110 in wavelength (preferably in a kilogram-meter-second unit, such as meters) of an electromagnetic signal under consideration. Thus, the relations of Equations [6]-[8] are illustrated in graphical representation 100. H-field phase curve 102, described by Equation [7], begins 90° out of phase with respect to E-field phase 104, described by Equation [6]. As range is increased from about 0.05λ to about 0.50λ, H-field phase curve 102 initially decreases, then increases. Similarly, as range is increased from about 0.05λ to about 0.50λ, E-field phase curve 104 increases, gradually at first, and at an increasing rate as range increases. The difference between E-field phase curve 104 and H-field phase curve 102 is represented by $\Delta\phi$ curve 106. $\Delta\phi$ curve 106 begins at approximately 90° (i.e., at phase quadrature) in the near-field within a range of about 0.05λ and goes to 0° (i.e., phase synchronicity) as the far-field is approached, past a range of about 0.50λ. $\Delta\phi$ curve 106 is described mathematically in Equation [8]. Transition of $\Delta\phi$ curve 106 from phase quadrature to phase synchronicity between about 0.05λ to about 0.50λ is substantially continuous and predictable and is used to advantage by the present invention. With more precise measurement, this phase transition can be beneficially used at ranges inside 0.05λ and outside 0.50λ.

Equation [8] expresses phase difference $\Delta\phi$ as a function of range (r). Equation [8] is a transcendental relation that may not be inverted to yield an expression for range as a function of phase difference. Nevertheless, a variety of mathematical methods may be used to determine a range given a phase difference. Equation [8] may be advantageously employed by other mathematical techniques such as, by way of example and not by way of limitation, solving numerically, generating a look-up table, and solving graphically.

In the far-field, at distances greater than one wavelength, both the electric and magnetic fields are phase synchronous. The phase of each field varies in lock step with the other field at a fixed rate of 360° per wavelength in the far-field limit. This is the usual relationship expected by those skilled in the RF arts. As a rule, the near-field phase anomalies exploited by the preferred embodiment of present invention are rarely discussed, if at all, in the prior art. One exception to this rule is the work of one of the inventors. [*Electromagnetic Energy Around Hertzian Dipoles*, by H. Schantz; IEEE Antennas and Propagation Magazine, April 2001; pp. 50-62.]

FIG. 2 is a table relating range of operation and frequency for a near-field ranging system. In FIG. 2, a table 200 relates frequency with selected ranges expressed in terms of wavelength of a signal under consideration. An important feature of the present invention is that a phase difference $\Delta\phi$ between electric and magnetic fields may be exploited to determine a range from a locator receiver to a beacon transmitter, or other source of electromagnetic waves. This near-field ranging method allows a distance to a beacon to be accurately determined between about $0.05\lambda$ and $0.50\lambda$ from the beacon, where $\lambda$ is the wavelength of electromagnetic signal transmitted by a beacon. Optimum performance is obtained from a range of about $0.08\lambda$ to a range of about $0.30\lambda$ from the beacon. With more precise measurement, this phase transition can be used for ranges inside $0.05\lambda$ and outside $0.50\lambda$. A corresponding characteristic range of operation as a function of frequency is presented in table 200; FIG. 2. Lower frequencies permit operation at longer ranges; higher frequencies are preferred for shorter ranges. The particular frequencies listed in table 200 (FIG. 2) are presented for purposes of illustration and not for purposes of limitation.

Determination of a range from a phase difference $\Delta\phi$ between an electric and a magnetic field may be more complicated than the free space result of Equation [8] indicates. In practice, one may wish to calibrate a ranging system using a more complicated analytical or computational model (for example, a model including the effect of propagation over a real ground instead of free space), or using experimental data from an environment within which one wishes to carry out ranging operations.

The present invention allows ranging to at least 3000 feet in the 160-190 kHz band, to at least 900 feet in the AM radio band, and to shorter ranges at higher frequencies. A wide variety of other operational ranges are available by using other frequencies. Greater range can be achieved with lower frequency. Accuracy within inches is achievable even at the longest ranges.

In the interest of presenting a simple illustrative example of the present invention, that is by way of illustration and not by way of limitation, this description addresses a mobile beacon and a stationary locator, but one skilled in the art may easily recognize that a beacon may be fixed and the locator mobile, or both beacon and locator may be mobile. To avoid unnecessary prolixity in the discussion that follows, sometimes only a single locator and a single beacon are discussed. This should not be interpreted so as to preclude a plurality of beacons and locators used as part of a more complicated positioning, locating, or tracking system.

A System for Near-Field Ranging

FIG. 3 is a schematic illustration of a system for near-field ranging by comparison of electric and magnetic field phase in quadrature. In FIG. 3, a ranging system 300 is illustrated for near-field ranging by comparison of electric and magnetic field phase with the electric and magnetic field signals in quadrature (90° out of phase) at close range. A beacon 310 includes a transmitter 312 and a transmit antenna 337. Beacon 310 transmits an electromagnetic wave or signal 315 having a wavelength $\lambda$.

A locator 320 receives electromagnetic signal 315. Locator 320 includes a first electric field antenna 332 for receiving an E-field signal 301 and a second magnetic field antenna 331 which receives an H-field signal 302. If a distance 304 between beacon 310 and locator 320 is, for example, $0.05\lambda$, then E-field signal 301 and H-field signal 302 are approximately 90° out of phase at antennas 331, 322. Locator 320 measures this phase difference $\Delta\phi$ and indicates that distance equals $0.05\lambda$ in a distance indicator 306.

FIG. 4 is a schematic illustration of a system for near-field ranging by comparison of electric and magnetic field phase in phase synchrony. In FIG. 4, a ranging system 400 is illustrated for near-field ranging by comparison of electric and magnetic field phase with the electric and magnetic field signals in phase synchronicity (0° phase difference) at far range. A beacon 410 includes a transmitter 412 and a transmit antenna 437. Beacon 410 transmits an electromagnetic signal 415 having a wavelength $\lambda$.

A locator 420 receives electromagnetic signal 415. Locator 420 has a first electric field antenna 432 which receives an E-field signal 401, and a second magnetic field antenna 431 which receives an H-field signal 402. If distance 404 between beacon 410 and locator 420 is $0.50\lambda$, then E-field signal 401 and H-field signal 402 are approximately 0° out of phase (in phase synchronicity). Locator 420 measures this phase difference $\Delta\phi$ and indicates that distance equals $0.05\lambda$ in a distance indicator 406.

Either locator 320, 420 may use the free space relationship between phase difference $\Delta\phi$ and range r described mathematically in Equation [8], may use a more exact analytic expression taking into account the effects of soil and ground propagation, may use a theoretical simulation of the propagation environment, or may use empirical data regarding phase difference and range in a particular propagation environment or another basis for determining the relationship between phase difference $\Delta\phi$ and range r.

Basic Architecture of a System for Near-Field Ranging

Figure 5:
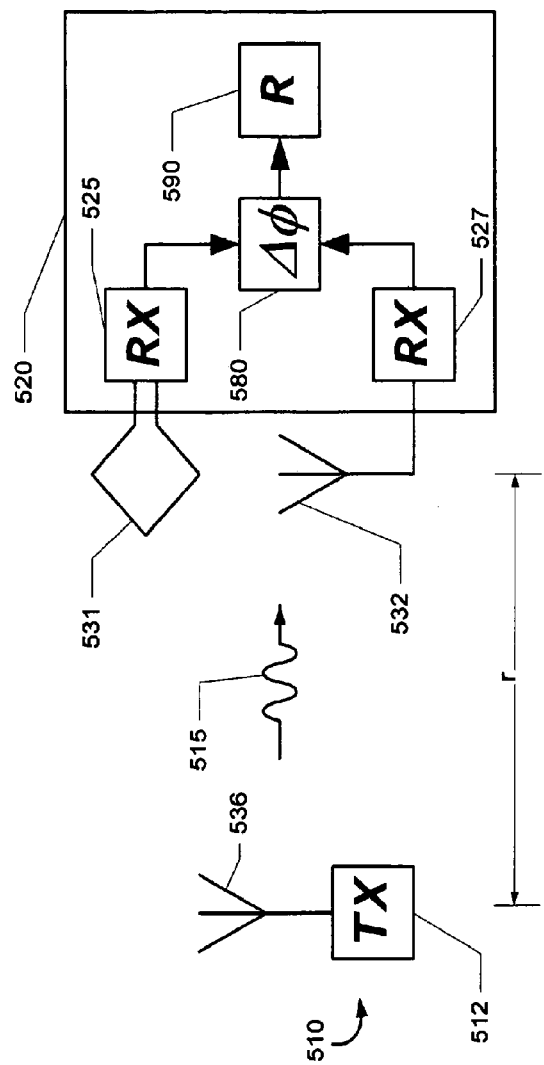
FIG. 5 is a schematic illustration of a system for near-field ranging by comparison of electric and magnetic field phase.

FIG. 5 is a schematic illustration of a system for near-field ranging by comparison of electric and magnetic field phase. In FIG. 5, a ranging system 500 is illustrated for near-field ranging by comparison of electric and magnetic field phase with the electric and magnetic field signals. A beacon 510 includes a transmitter 512 and a transmit antenna 536. Beacon 510 may be mobile, or fixed, or even an unknown or uncooperative source of electromagnetic radiation in the form of an electromagnetic signal 515. Transmit antenna 536 can be a loopstick antenna or another type antenna that is substantially unaffected by changes in an adjacent propagation environment. Transmit antenna 536 could also be a whip antenna that is as large as is allowed by either pertinent regulations or the constraints imposed by a particular application. Beacon 510 transmits electromagnetic signal 515.

A locator 520 is situated a distance r from beacon 510 and receives electromagnetic signal 515. Locator 520 includes a first antenna 531, a first receiver 525, a second antenna 532, a second receiver 527, a signal comparator 580, and a range detector 590. Signal comparator 580 receives a first representative signal from first receiver 525 and a second representative signal from second receiver 527. Signal comparator 580 receives the first and second representative signals and identifies a difference between the first and second representative signals. The identified difference may be a difference in phase, a difference in amplitude, or another difference between the first and second representative signals. Signal comparator 580 generates a third signal proportional to or otherwise related to the difference identified by signal comparator 580. Range detector 590 receives the third signal from signal comparator 580 and employs the received third signal to determine range r between beacon 510 and locator 520.

In the preferred embodiment of the present invention, first antenna 531 is configured to permit first receiver 525 to generate the first representative signal provided to signal comparator 580 as a signal proportional to or otherwise representative of a first component of electromagnetic signal 515. Further in the preferred embodiment of the present invention, second antenna 532 is configured to permit second receiver 527 to generate the second representative signal provided to signal comparator 580 as a signal proportional to or otherwise representative of a second component of electromagnetic signal 515. The first component and second component of electromagnetic signal 515 may differ in polarization or some other detectable property. One difference advantageous in a near-field ranging system is a difference between a longitudinal or radial ($\hat{r}$) component and a transverse component ($\hat{\theta}$ or $\hat{\phi}$) of electromagnetic signals. In another preferred embodiment of the present invention, first antenna 531 is an electric or E-field antenna that permits first receiver 525 to generate the first representative signal provided to signal comparator 580 as a signal proportional to or otherwise representative of a first component of electromagnetic signal 515, and second antenna 532 is a magnetic or H-field antenna that permits second receiver 527 to generate the second representative signal provided to signal comparator 580 as a signal proportional to or otherwise representative of a second component of electromagnetic signal 515.

In the most preferred embodiment of the present invention, first antenna 531 is an H-field antenna, first receiver 525 is an H-field receiver, second antenna 532 is an E-field antenna, second receiver 527 is an E-field receiver, signal comparator 580 is a phase detector and range detector 590 employs phase information received from signal comparator-phase detector 580 to determine range r between beacon 510 and locator 520. Thus, in the most preferred embodiment of the present invention first (H-field) antenna 531 responsive to a magnetic or H-field component of electromagnetic signal 515 and permits first (H-field) receiver 525 to detect a first signal proportional to the magnetic or H-field component of electromagnetic signal 515. Antennas responsive to a magnetic or H-field component of an electromagnetic signal include, by way of example and not by way of limitation, loop and loopstick antennas. First (H-field) receiver 525 receives a signal from first (H-field) antenna 531 and generates a first representative signal proportional to the magnetic or H-field component of electromagnetic signal 515. The representative signal may, for example, be an analog signal having a voltage that is directly proportional to amplitude of the magnetic or H-field component of electromagnetic signal 515. Alternatively, the representative signal may be, for example, a digital signal conveying data pertaining to the magnetic or H-field component of electromagnetic signal 515. First (H-field) receiver 525 may include filtering, amplification, analog to digital conversion, and tuning means of the kind that are generally understood by practitioners of the RF arts.

Second (E-field) antenna 532 responsive to an electric or E-field component of electromagnetic signal 515 allows second (E-field) receiver 527 to detect a second signal proportional to an electric or E-field component of electromagnetic signal 515. Antennas responsive to an electric or E-field component of an electromagnetic wave include, by way of example and not by way of limitation, whip, dipole, or monopole antennas. Second (E-field) receiver 527 detects an input signal from second (E-field) antenna 532 and yields a second signal proportional to the electric or E-field component of electromagnetic signal 515. The representative signal may, for example, be an analog signal whose voltage is directly proportional to amplitude of the electric or E-field component of electromagnetic signal 515. Alternatively, the representative signal may be, for example, a digital signal conveying data pertaining to the electric or E-field component of electromagnetic signal 515. Second (E-field) receiver 527 may include filtering, amplification, analog to digital conversion, and tuning means of the kind that are generally understood by practitioners of the RF arts.

If electromagnetic signal 515 is a single frequency sine wave, it is desirable for a first (H-field) receiver 525 and a second (E-field) receiver 527 to employ a very narrow bandwidth filter so as to minimize the noise and maximize the signal to noise ratio. However, it is also important for filters used in a first (H-field) receiver 525 and a second (E-field) receiver 527 to have a constant passband group delay so that relative phase characteristics of a first representative signal and a second representative signal are stable and predictable. The inventors have advantageously employed Bessel filters as a starting point for optimization.

First (H-field) antenna 531 and second (E-field) antenna 532 are preferably oriented to be maximally responsive to polarization of electromagnetic signal 515. In alternate embodiments, locator 520 may employ additional (H-field) antennas, additional (E-field) antennas, additional H-field receivers, and additional E-field receivers in order to detect multiple polarizations or so as to detect electromagnetic signals from additional incident directions. Because electromagnetic signal 515 has near-field characteristics, polarizations may advantageously include a longitudinal polarization with a component parallel to a direction of travel of an incident electromagnetic signal.

Signal comparator 580 (preferably embodied in a phase detector) takes the first representative signal proportional to the magnetic or H-field component of electromagnetic signal 515 and the second representative signal proportional to the electric or E-field component of electromagnetic signal 515 and determines a phase difference between the first and second representative signals. Phase detector 580 may be thought of (for purposes of illustration and not limitation) as a mixer that receives the first and second representative signals and produces a quasi-static signal proportional to a quasi-static phase difference between the first and second representative signals. In an alternate embodiment, phase detector 580 may be implemented with an AND gate having as inputs the first and second representative signals and whose output is provided to an integrator. The output of the integrator is a quasi-static signal proportional to a quasi-static phase difference between the first representative signal and the second representative signal. The term "quasi-static" in this context means varying on a time scale substantially similar to a variation in phase, not necessarily a time scale or period substantially similar to that of electromagnetic signal 515. In other embodiments, phase detector 580 may receive or capture a time domain signal and detect zero crossings or other characteristics of wave shape in order to determine an effective phase difference between the first representative signal and the second representative second signal. Suitable phase detectors are readily available—such as, by way of example and not by way of limitation, an Analog Devices part no. AD 8302. Another embodiment of phase detector 580 may take digital information from first (H-field) receiver 525 and second (E-field) receiver 527 and calculate a phase difference between the first digital information and the second digital information.

Range detector 590 may be embodied in any means capable of converting a measured phase difference to a range r. In a particular simple example, range detector 590 may be an analog voltmeter having a scale calibrated to read a range r as a function of an applied voltage from phase detector 580. A more sophisticated embodiment of range detector 590 may, for example, advantageously employ an analog to digital converter and a micro-controller or micro-processor to calculate a range r from an applied voltage received from phase detector 580. Range detector 590 may include visual, audio, or other outputs to indicate range r to a user, or may convey a measured range r to a remote location for further analysis as part of a comprehensive tracking, positioning, or locating system.

Locator 520 may be generally regarded as comprising a means for detecting and receiving a first signal, a means for detecting and receiving a second signal, a means for determining a difference between a first and a second representative signal related to the first and second signals and a means for determining a range given a difference between the first and second representative signals.

Beacon 510 may be generally regarded as comprising a means for transmitting an electromagnetic signal. Beacon 510 may be a fixed reference with respect to which a mobile locator 520 determines a distance or range r. Alternatively, a fixed locator 520 may measure range r of a mobile beacon 510, or a locator 520 may be a mobile unit that measures range r of a mobile beacon 510. Furthermore, beacon 510 may be an uncooperative transmitter or other source of an electromagnetic signal 515 whose range r one desires to know with respect to the position of a locator 520.

A Preferred Embodiment

Figure 6:
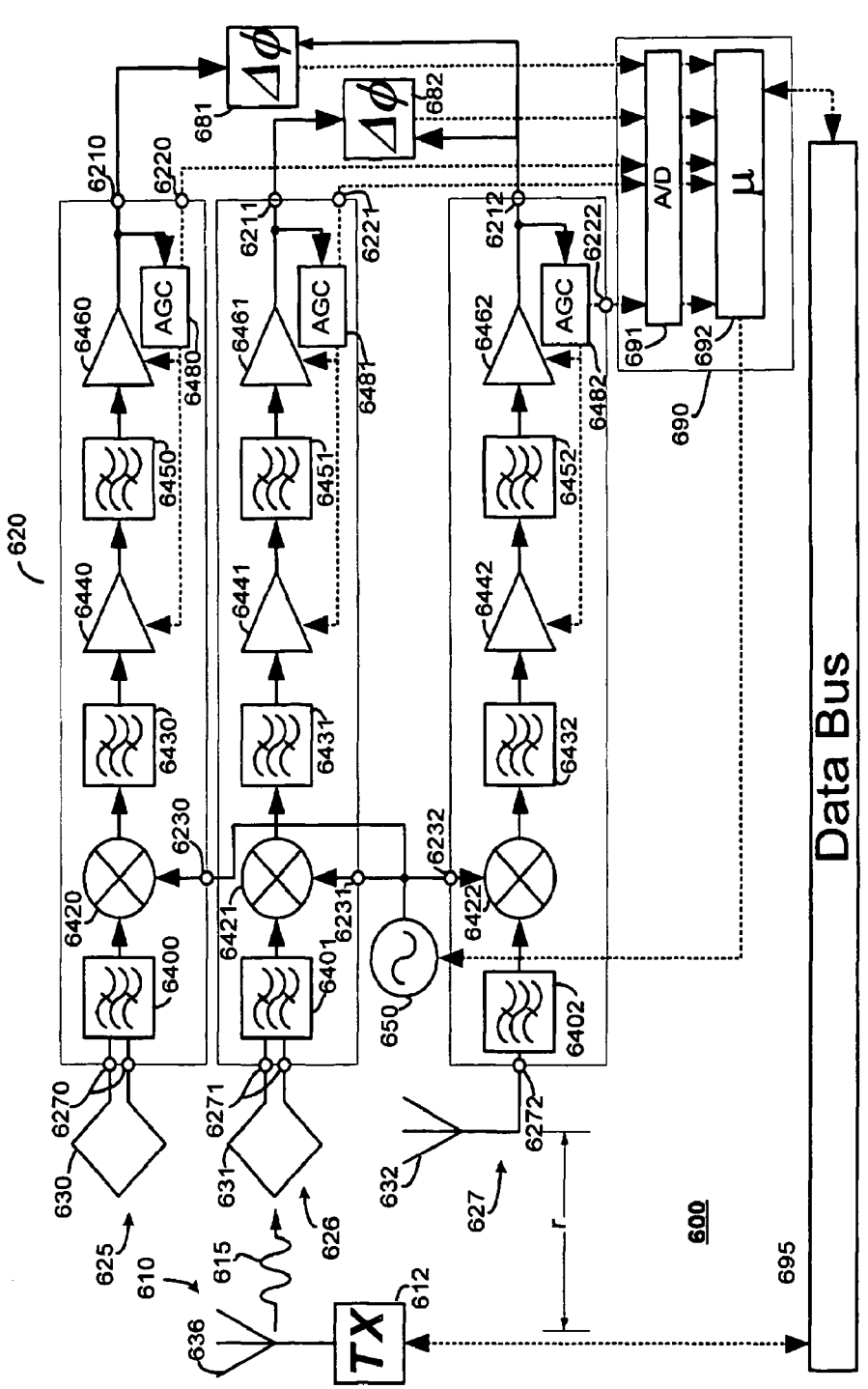
FIG. 6 is a schematic diagram of details of a preferred embodiment of a system for near-field ranging by comparison of electric and magnetic field phase.

FIG. 6 is a schematic diagram of details of a preferred embodiment of a system for near-field ranging by comparison of electric and magnetic field phase. In FIG. 6, a ranging system 600 includes a beacon 610 and a locator 620 separated from beacon 610 by a range r. Beacon 610 includes a transmitter 612 which may be mobile or fixed, and a transmit antenna 636. Transmitter 612 may include means to change properties of a transmitted electromagnetic signal 615 including, by way of illustration and not by way of limitation, changing frequency, phase, polarization, or amplitude of an electromagnetic signal 615 according to a predetermined pattern, in response to an input or stimulus, such as, for example, a control signal received from a data bus 695. In alternate embodiments, transmitter 612 may modulate a transmitted electromagnetic signal 615 so as to convey information. Such information may include information that identifies beacon 610 or other information or telemetry of value to a user. For example, binary phase shift keying may be implemented on a transmitted electromagnetic signal 615 without impairing ranging performance of the present invention. In still another embodiment, transmitter 612 may turn on or off according to a predetermined pattern, in response to a control signal from a data bus 695, or in response to some other input or stimulus. Such input or stimulus may include (but is not necessarily limited to) a signal from an accelerometer, a timer, a motion detector, other transducers or other sensors.

It may be advantageous in some applications for transmitter 612 to operate at a higher instantaneous power and a lower duty cycle. For instance, transmitter 612 might operate at approximately ten times an allowed average power level but only transmit 10% of a characteristic period, thus maintaining a substantially similar average transmit power level. Such intermittent operation would enable a higher signal to noise ratio (SNR) signal. Periodic operation of beacon 610 is also advantageous for operation in the presence of interference. When beacon 610 is silent (i.e., not transmitting), locator 620 can characterize a particular coherent noise source such as an interfering signal and can compensate for the presence of this coherent noise once beacon 610 begins transmitting again.

In applications where security is particularly important, beacon 610 may employ techniques to make electromagnetic signal 615 more difficult to detect by an eavesdropper. These techniques may include a frequency hopping scheme, periodic operation, varying transmit power to use the minimum power needed to make an accurate measurement, or other means to render signal 615 less detectable by an eavesdropper. Transmit power control may be further advantageous to allow frequency reuse in smaller cell sizes.

A first step in determining range r between beacon 610 and locator 620 is for a beacon 610 to transmit an electromagnetic signal 615. In a preferred embodiment, electromagnetic signal 615 is vertically polarized, but horizontal polarization or alternate polarizations are usable as well. To avoid unnecessary complication the electromagnetic coupling between beacon 610 and locator 620 is described in terms of an electromagnetic wave comprising electromagnetic signal 615. Because range r between beacon 610 and locator 620 is typically less than a wavelength of electromagnetic signal 615, electromagnetic signal 615 is not typically a radiation electromagnetic wave decoupled from beacon 610 such as would be found in the far-field at a range r significantly greater than one wavelength of electromagnetic signal 615. It should be understood that an electromagnetic wave comprising electromagnetic signal 615 is typically a reactive or coupled electromagnetic wave, rather than a radiation or decoupled electromagnetic wave.

Locator 620 receives electromagnetic signal 615. In a preferred embodiment, locator 620 includes a first (H-field) channel 625, a second (H-field) channel 626, a third (E-field) channel 627, a local oscillator 650, a first phase detector 681, a second phase detector 682, and a range detector 690 (including an analog to digital (A/D) converter 691, and a microprocessor 692). An optional data bus 695 may be used to provide a means for exchanging control and data signals among a plurality of beacons and locators (not shown in detail in FIG. 6).

First (H-field) channel 625 includes a first (H-field) antenna 630, a first (H-field) pre-select filter 6400, a first (H-field) mixer 6420, a first (H-field) primary IF filter 6430, a first (H-field) primary IF amplifier 6440, a first (H-field) secondary IF filter 6450, a first (H-field) secondary IF amplifier 6460, and a first (H-field) automatic gain control 6480. First (H-field) channel 625 has a first (H-field) antenna port 6270, a first (H-field) tuning port 6230, a first (H-field) received signal strength indicator (RSSI) port 6220, and a first (H-field) signal output port 6210.

A second (H-field) channel 626 includes a second (H-field) antenna 631, a second (H-field) pre-select filter 6401, a second (H-field) mixer 6421, a second (H-field) primary IF filter 6431, a second (H-field) primary IF amplifier 6441, a second (H-field) secondary IF filter 6451, a second (H-field) secondary IF amplifier 6461, and a second (H-field) automatic gain control 6481. Second (H-field) channel 626 has a second (H-field) antenna port 6271, a second (H-field) tuning port 6231, a second (H-field) received signal strength indicator (RSSI) port 6221, and a second (H-field) signal output port 6211. A third (E-field) channel 627 includes a third (E-field) antenna 632, a third (E-field) pre-select filter 6402, a third (E-field) mixer 6422, a third (E-field) primary IF filter 6432, a third (E-field) primary IF amplifier 6442, a third (E-field) secondary IF filter 6452, a third (E-field) secondary IF amplifier 6462, and a third (E-field) automatic gain control 6482. Third (E-field) channel 627 has a third (E-field) antenna port 6272, a third (E-field) tuning port 6232, a third (E-field) received signal strength indicator (RSSI) port 6222, and a third (E-field) signal output port 6212.

First (H-field) antenna 630 is responsive to the magnetic or H-field component of electromagnetic signal 615 and presents a received signal proportional to the magnetic or H-field component of electromagnetic signal 615 to first (H-field) pre-select filter 6400. First (H-field) pre-select filter 6400 passes a first representative signal proportional to the magnetic or H-field component of electromagnetic signal 615, but rejects signals with undesirable frequencies. First (H-field) pre-select filter 6400 may be, for example, a band pass filter or a low pass filter. Typically first (H-field) pre-select filter 6400 will pass those frequencies within which beacon 610 might transmit an electromagnetic signal 615 for a relevant application. Selection of a band will depend upon a variety of factors including, but not necessarily limited to, regulatory constraints, propagation behavior of electromagnetic signal 615, and a desired range r of operation.

First (H-field) mixer 6420 mixes the first representative signal received from first (H-field) pre-select filter 6400 with a local oscillator (LO) signal generated by local oscillator 650 to generate a first intermediate frequency (or IF) representative signal. Local oscillator 650 may be a traditional sine wave oscillator, a direct digital synthesizer (DDS), or other oscillator or waveform template source.

First primary (H-field) IF filter 6430 accepts only the desired first IF representative signal and rejects other undesired signals. A crystal filter may be advantageously used as first primary (H-field) IF filter 6430. Such a crystal filter is characterized by an extremely narrow pass band, and preferably has a constant group delay within the pass band. A narrow pass band acts to allow the desired first IF representative signal to be conveyed to first primary (H-field) IF amplifier 6440 while rejecting adjacent undesired signals. First primary (H-field) IF amplifier 6440 increases the amplitude of the first IF representative signal and conveys the amplified first IF representative signal to first secondary (H-field) IF filter 6450. First secondary (H-field) IF filter 6450 accepts only the desired first IF representative signal and rejects other undesired signals. A crystal filter may be advantageously used as first secondary (H-field) IF filter 6450. Such a crystal filter is characterized by an extremely narrow pass band, and preferably has a constant group delay within the pass band. A narrow pass band acts so as to allow the desired first IF representative signal to be conveyed to first secondary (H-field) IF amplifier 6460 while rejecting adjacent undesired signals. First secondary (H-field) IF amplifier 6460 increases the amplitude of the first IF representative signal and conveys the first IF representative signal to signal output port 6210 and to first automatic gain control (AGC) 6480.

First automatic gain control 6480 adjusts a gain of first primary (H-field) IF amplifier 6440 and first secondary (H-field) IF amplifier 6460 to maintain a desired level of the first IF representative signal. By dividing a desired total gain between first primary (H-field) IF amplifier 6440 and first secondary (H-field) IF amplifier 6460, a high total gain and a large dynamic range can be maintained with greater stability and reliability than in a single amplification stage alone. Similarly, by dividing the desired filtering between first primary (H-field) IF filter 6430 and first secondary (H-field) IF filter 6450, a more narrow passband can be achieved with greater stability and greater reliability than with a single filter stage alone. First automatic gain control 6480 preferably includes a received signal strength indicator (RSSI) and conveys an RSSI level to RSSI output 6220. Second (H-field) antenna 631 is responsive to the magnetic or H-field component of electromagnetic signal 615 and presents a received signal proportional to the magnetic or H-field component of electromagnetic signal 615 to second (H-field) pre-select filter 6401.

Second (H-field) pre-select filter 6401 passes a first representative signal proportional to the magnetic or H-field component of electromagnetic signal 615, but rejects signals with undesirable frequencies. Second (H-field) pre-select filter 6401 may be, for example, a band pass filter or a low pass filter. Typically second (H-field) pre-select filter 6401 will pass those frequencies within which beacon 610 might transmit an electromagnetic signal 615 for a relevant application. Selection of a band will depend upon a variety of factors including, but not necessarily limited to, regulatory constraints, propagation behavior of electromagnetic signal 615, and a desired range r of operation. Second (H-field) mixer 6421 mixes the first representative signal received from second (H-field) pre-select filter 6401 with a local oscillator (LO) signal generated by local oscillator 650 to generate a second intermediate frequency (or IF) representative signal. Local oscillator 650 may be a traditional sine wave oscillator, a direct digital synthesizer (DDS), or other oscillator or waveform template source.

Second primary (H-field) IF filter 6431 accepts only the desired second IF representative signal and rejects other undesired signals. A crystal filter may be advantageously used as second primary (H-field) IF filter 6431. Such a crystal filter is characterized by an extremely narrow pass band, and preferably has a constant group delay within the pass band. A narrow pass band acts to allow the desired second IF representative signal to be conveyed to second primary (H-field) IF amplifier 6441 while rejecting adjacent undesired signals. Second primary (H-field) IF amplifier 6441 increases the amplitude of the second IF representative signal and conveys the amplified second IF representative signal to second secondary (H-field) IF filter 6451. Second secondary (H-field) IF filter 6451 accepts only the desired second IF representative signal and rejects other undesired signals. A crystal filter may be advantageously used as second secondary (H-field) IF filter 6451. Such a crystal filter is characterized by an extremely narrow pass band, and preferably has a constant group delay within the pass band. A narrow pass band acts so as to allow the desired second IF representative signal to be conveyed to second secondary (H-field) IF amplifier 6461 while rejecting adjacent undesired signals. Second secondary (H-field) IF amplifier 6461 increases the amplitude of the second IF representative signal and conveys the second IF representative signal to signal output port 6211 and to second automatic gain control (AGC) 6481.

Second automatic gain control 6481 adjusts a gain of second primary (H-field) IF amplifier 6441 and second secondary (H-field) IF amplifier 6461 to maintain a desired level of the second IF representative signal. By dividing a desired total gain between second primary (H-field) IF amplifier 6441 and second secondary (H-field) IF amplifier 6461, a high total gain and a large dynamic range can be maintained with greater stability and reliability than in a single amplification stage alone. Similarly, by dividing the desired filtering between second primary (H-field) IF filter 6431 and second secondary (H-field) IF filter 6451, a narrower passband can be achieved with greater stability and greater reliability than with a single filter stage alone. Second automatic gain control 6481 preferably includes a received signal strength indicator (RSSI) and conveys an RSSI level to RSSI output 6221.

Third (E-field) antenna 632 is responsive to the electric or E-field component of electromagnetic signal 615 and presents a received signal proportional to the electric or E-field component of electromagnetic signal 615 to third (E-field) pre-select filter 6402. Third (E-field) pre-select filter 6402 passes a third representative signal proportional to the electric or E-field component of electromagnetic signal 615, but rejects signals with undesirable frequencies. Third (E-field) pre-select filter 6402 may be, for example, a band pass filter or a low pass filter. Typically third (E-field) pre-select filter 6402 will pass those frequencies within which beacon 610 might transmit an electromagnetic signal 615 for a relevant application. Selection of a band will depend upon a variety of factors including, but not necessarily limited to, regulatory constraints, propagation behavior of electromagnetic signal 615, and a desired range r of operation.

Third (E-field) mixer 6422 mixes the third representative signal received from third (E-field) pre-select filter 6402 with a local oscillator (LO) signal generated by local oscillator 650 to generate a third intermediate frequency (or IF) representative signal. Local oscillator 650 may be a traditional sine wave oscillator, a direct digital synthesizer (DDS), or other oscillator or waveform template source.

Third primary (E-field) IF filter 6432 accepts only the desired third IF representative signal and rejects other undesired signals. A crystal filter may be advantageously used as third primary (E-field) IF filter 6432. Such a crystal filter is characterized by an extremely narrow pass band, and preferably has a constant group delay within the pass band. A narrow pass band acts to allow the desired third IF representative signal to be conveyed to third primary (E-field) IF amplifier 6442 while rejecting adjacent undesired signals. Third primary (E-field) IF amplifier 6442 increases the amplitude of the third IF representative signal and conveys the amplified third IF representative signal to third secondary (E-field) IF filter 6452. Third secondary (E-field) IF filter 6452 accepts only the desired third IF representative signal and rejects other undesired signals. A crystal filter may be advantageously used as third secondary (E-field) IF filter 6452. Such a crystal filter is characterized by an extremely narrow pass band, and preferably has a constant group delay within the pass band. A narrow pass band acts so as to allow the desired third IF representative signal to be conveyed to third secondary (E-field) IF amplifier 6462 while rejecting adjacent undesired signals. Third secondary (E-field) IF amplifier 6462 increases the amplitude of the third IF representative signal and conveys the third IF representative signal to signal output port 6212 and to third automatic gain control (AGC) 6482.

Third automatic gain control 6482 adjusts a gain of second primary (E-field) IF amplifier 6442 and third secondary (E-field) IF amplifier 6462 to maintain a desired level of the third IF representative signal. By dividing a desired total gain between third primary (E-field) IF amplifier 6442 and third secondary (E-field) IF amplifier 6462, a high total gain and a large dynamic range can be maintained with greater stability and reliability than in a single amplification stage alone. Similarly, by dividing the desired filtering between third primary (E-field) IF filter 6432 and third secondary (E-field) IF filter 6452, a more narrow passband can be achieved with greater stability and greater reliability than with a single filter stage alone. Third automatic gain control 6482 preferably includes a received signal strength indicator (RSSI) and conveys an RSSI level to RSSI output 6222.

Local oscillator 650 may also be advantageously used as a tuner to select among a plurality of electromagnetic signals 615 transmitted by a plurality of beacons 610. A particular beacon 610 emitting a particular electromagnetic signal 615 may be distinguished from other beacons 610 emitting other electromagnetic signals 615 with slightly different frequencies. Thus a single locator 620 may track a large number of different beacons 610. A variety of other schemes for tracking multiple beacons 610 are possible, including, for example, time division multiple access. If a beacon 610 modulates a transmitted electromagnetic signal 615 with identifying information, one can distinguish among a plurality of beacons 610 operating at the same frequency. Similarly, a large number of different locators 620 may measure ranges r to a common beacon 610. Although synchronization is not required between beacon 610 and locator 620, a common local oscillator 650 acts to maintain synchronization among a plurality of channels 625, 626, 627 within a single locator 620. Synchronization among plurality of channels 625, 626, 627 within locator 620 is advantageous to enable precision phase comparisons among signals received by plurality of channels 625, 626, 627.

In other embodiments, local oscillator 650 may tune a first channel 625, a second channel 626, or a third channel 627 (or various combinations of channels 625, 626, 627) to sweep through a variety of frequencies of interest. Micro-processor 692 may monitor and compile data from RSSI ports 6220, 6221, 6222 (or various combinations of RSSI ports 6220, 6221, 6222) to characterize a noise and interference environment. Micro-processor 692 may convey appropriate control signals through data bus 695 to a plurality of beacons 610 to select optimal frequencies or modes of operation given a characterized noise and interference environment. Similarly, in a dense signal environment with many simultaneously operating beacons 610, micro-processor 692 may monitor signals and convey appropriate control signals through data bus 695 to a plurality of beacons 610 to assign optimal frequencies or modes of operation among a plurality of beacons 610 for facilitating coexistence within and among the plurality of beacons 610. Further, micro-processor 692 may monitor range r and convey appropriate control signals through data bus 695 to a respective beacon 610 to assign an optimal frequency or mode of operation appropriate for the respective beacon 610 appropriate for operation at a detected range r to the respective beacon 610.

In other embodiments, channels in addition to channels 625, 626, 627 may be used so that a locator 620 may simultaneously track a plurality of beacons 610 generating electromagnetic signals 615 at different frequencies. Further, additional channels may be advantageously employed in detecting and characterizing a noise and interference environment. In still other embodiments, additional channels associated with alternate polarizations may enable ranging system 600 to make measurements unimpaired by the relative orientation of a beacon 610 with respect to a locator 620.

In ranging system 600 (FIG. 6), first phase detector 681 receives the first IF representative signal from first signal output port 6210 and receives the third IF representative signal from third signal output port 6212 and determines phase difference between the first and third IF representative signals. Second phase detector 682 receives the second IF representative signal from second signal output port 6211 and receives the third IF representative signal from third signal output port 6212 and determines phase difference between the second and third IF representative signals. In a preferred embodiment, locator 620 has two H-field channels (first (H-field) channel 625 and second (H-field) channel 626) and a third (E-field) channel 627. In a preferred embodiment using a vertically polarized electromagnetic signal 615, third electric antenna 632 is a vertical whip antenna with an omni-directional pattern in a first plane perpendicular to the axis of the whip. In a preferred embodiment magnetic antennas 630, 631 are loop antennas with an omni-directional pattern in a second plane substantially perpendicular to a first plane (associated with the whip antenna of third electric antenna 632). It is advantageous to have two magnetic antennas 630, 631 to achieve sensitivity to a magnetic component of an electromagnetic signal 615 incident in any direction. With only one magnetic antenna 630 or 631 locator 620 will tend be insensitive to a beacon 610 positioned in a direction that lies in a null of the single magnetic antenna 630 or 631. By having two magnetic antennas 630, 631 locator 620 can determine range r to a beacon 610 in any direction. An additional advantage of having two magnetic antennas 630, 631 is that locator 620 may use prior art techniques to obtain angle of arrival information in addition to range information.

For optimal performance of phase detectors 681, 682 it is advantageous for amplitudes of first, second and third IF representative signals to be maintained within a desired amplitude limit. Automatic gain controls 6480, 6481, 6482 act to maintain a desired amplitude limit for the first, second and third IF representative signals. Phase detectors 681, 682 may employ log amps to maintain constant signal levels, such as are used in an Analog Devices part no. AD 8302 (phase detector IC). Alternatively, channels 625, 626, 627 may include a limiter (not shown in FIG. 6) to limit output signal levels. Range detector 690 translates measured phase differences received from phase detectors 681, 682 to range r. In a preferred embodiment, range detector 690 includes an analog to digital converter 691 and a microprocessor (or a microcontroller) 692 that cooperate to calculate range r based upon signals received from one or both of phase detectors 681, 682. In a preferred embodiment, range detector 690 also monitors RSSI levels from RSSI ports 6220, 6221, 6222 so that range detector 690 can select either of phase detectors 681, 682 (or both) to use in determining range r. Range detector 690 may also compare RSSI levels from RSSI ports 6220, 6221, 6222 to determine angle of arrival of electromagnetic signal 615. Typically first phase detector 681 will be preferred if beacon 610 lies in the pattern of first magnetic field antenna 630 and second phase detector 682 will be preferred if beacon 610 lies in the pattern of second magnetic field antenna 631. Ideally range detector 690 will selectively employ signals received from phase detectors 682, 682 to optimize range measurement. Such optimization might also involve, for example, locator 620 combining signals received from magnetic field antennas 630, 631 to create an effective antenna pattern that nulls out an interfering signal, or maximizes a desired signal. RSSI levels from RSSI ports 6220, 6221, 6222 may also be used by range detector 690 to supplement or complement information from phase detectors 681, 682 in determining range r.

Range detector 690 may include visual, audio, or other output formats to indicate range r to a user, or may convey a measured range r to a remote location for further analysis as part of a comprehensive positioning, tracking, or locating system. Range detector 690 may also include means to control local oscillator 650 including (but not necessarily limited to) setting a frequency of a local oscillator signal.

Data bus 695 is optional and when employed allows data and control signals to be conveyed between locator 620 and beacon 610. Data bus 695 may involve a wireless network (such as an 802.11b network), a hard wired network (such as an Ethernet connection or a serial cable), or may employ modulation of electromagnetic signal 615 transmitted by beacon 610. A plurality of locators 620 and beacons 610 may share a common data bus 695. Such a plurality of locators 620 and beacons 610 may operate cooperatively to establish a comprehensive tracking, positioning, or locating system. With a wireless data bus 695, beacon 610 is no longer strictly a transmit-only device. Because only a transmitted electromagnetic signal 615 is necessary for ranging operations, with a wireless data link precise timing required for a traditional transponder ranging system is eliminated. Timing information can be conveyed via the wireless data link.

Locator 620 may be regarded as comprising a means for detecting or receiving a first (H-field) signal, a means for detecting or receiving a second (H-field) signal, a means for detecting or receiving a third (E-field) signal, a means for determining a first phase difference between a first and a third signal, a means for determining a second phase difference between a second and a third signal, and a means for determining a range r given a first and a second phase difference. It may also be advantageous to include in locator 620 a means for tuning a locator 620 whereby range data may be obtained for any of a plurality of beacons 610, each generating an electromagnetic signal at a different frequency.

Still further advantages may accrue by adding to locator 620 a means for conveying data among a plurality of locators 620 and a plurality of beacons. Such a means (e.g., a data bus or a wireless link 695) could be advantageously employed in a comprehensive tracking, positioning, or locating system.

It should be kept in mind that functions and components of locator 620 need not be implemented in a single unit. For example, it may be advantageous to place first (H-field) antenna 630, second (H-field) antenna 631, and third (E-field) antenna 632 at respective locations distant from other components or functionality of locator 620. Antennas may, for example, be connected via RF cables if a stand-off were desired for safety reasons, economic reasons, operational reasons, ease-of-use or for any other reasons. Similarly, locator 620 may implement signal detection and reception in one location and phase detection in another. Locator 620 may also implement phase detection in one location and relay data to a range detector 690 at a remote location for determination of range r.

Combined Beacon-Locator

Figure 7:
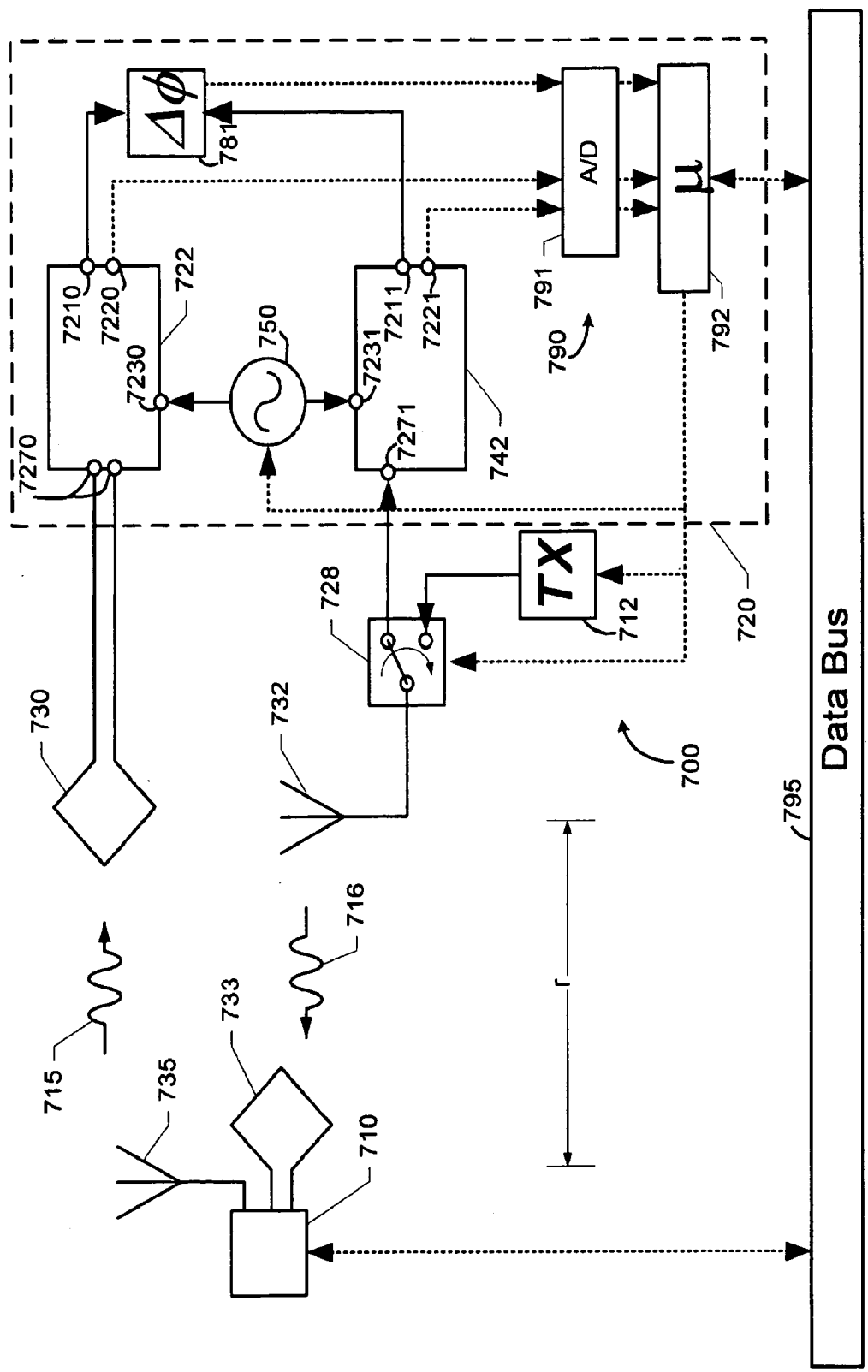
FIG. 7 is a schematic diagram of a system for near-field ranging by comparison of electric and magnetic field phase with beacon and locator function combined in a single unitary device.

FIG. 7 is a schematic diagram of a system for near-field ranging by comparison of electric and magnetic field phase with beacon and locator function combined in a single unitary device. In FIG. 7, a combined beacon-locator apparatus 700 is configured to operate as a beacon whose range r from a remote locator (such as a remote beacon-locator apparatus 710 operating as a locator) may be measured by the remote locator. Alternatively, beacon-locator apparatus 700 can operate as a locator that measures range r to another beacon (such as remote beacon-locator apparatus 710 operating as a beacon). Beacon-locator apparatus 700 includes a first magnetic (H-field) antenna 730, a second (E-field) antenna 732, a transmit-receive switch 728, a transmitter 712, and a locator receiver 720. Locator receiver 720 includes a first (H-field) receiver 722, a second (E-field) receiver 742, a phase detector 781, and a range detector 790. An optional data bus 795 permits communication between or among a plurality of beacon-locators, beacons, locators, or other devices.

Combined Beacon-Locator in Locator Mode

Remote beacon-locator apparatus 710 (operating in a bacon mode) transmits an electromagnetic signal 715 that is received by beacon-locator system 700 operating in a locator mode. First (H-field) antenna 730 is sensitive to a magnetic component of an incident electromagnetic signal 715 and conveys a representative magnetic signal proportional to the magnetic component of electromagnetic signal 715 to an antenna port 7270 of first (H-field) receiver 722.

First (H-field) receiver 722 receives the representative magnetic signal at first antenna port 7220, and receives a local oscillator (LO) signal from a local oscillator 750 at a local oscillator port 7230. Using filtering, amplification and mixing means generally known to practitioners of the RF arts (an example of which is described in connection with FIG. 6), first (H-field) receiver 722 presents a first received intermediate frequency (IF) representative signal at a first output port 7210 and an RSSI signal at an RSSI port 7220.

Because beacon-locator apparatus 700 is operating in a locator mode, transmit-receive switch 728 is set to couple second (E-field) antenna 732 to second (E-field) receiver 742.

In an alternate embodiment, transmit-receive switch 728 may be a circulator or other device that allows a beacon-locator, such as beacon-locator apparatus 700, to function as a beacon and as a locator simultaneously. Second (E-field) antenna 732 sensitive to the electric component of incident electromagnetic signal 715 and conveys a representative electric signal proportional to the electric component of electromagnetic signal 715 to an antenna port 7271 of second (E-field) receiver 742. Second (E-field) receiver 742 receives the representative electric signal at second antenna port 7271, and receives a local oscillator (LO) signal from local oscillator 750 at a local oscillator port 7231. Using filtering, amplification and mixing means generally known to practitioners of the RF arts (an example of which is discussed in connection with FIG. 6), second (E-field) receiver 742 presents a second received intermediate frequency (IF) representative signal at a second output port 7211 and an RSSI signal at an RSSI port 7221.

Phase detector 781 receives the first representative signal from output port 7210 and receives the second representative signal from output port 7211. Phase detector 781 generates a phase difference output signal proportional to the phase difference between the first and second representative signals and conveys the phase difference output signal to range detector 790. Range detector 790 includes an analog to digital converter 791 and a micro-processor 792. Range detector 790 receives RSSI signals from RSSI ports 7220, 7221 and the phase difference output signal from a phase detector 781. Analog to digital converter 791 converts these signals to digital signals and conveys them to micro-processor 792. Micro-processor 792 calculates range r based upon the digital signal inputs received from analog to digital converter 791. Among the means by which a micro-processor 792 may determine a range r are, for example: 1) Free space theory as presented in Equation [8], 2) a more precise analytical or numerical model including ground and other effects of a propagation environment, and 3) a model based upon empirical measurements. Range r may be calculated from a phase input alone or using a more complicated model including input from RSSI ports 7220, 7221.

Micro-processor 792 may adjust a frequency of local oscillator 750 to tune first (H-field) receiver 722 and second (E-field) receiver 742. This enables beacon-locator apparatus 700 to measure range r of a variety of other beacons 710 or beacon-locators 700 operating at different frequencies. Micro-processor 792 also enables beacon-locator apparatus 700 to use a frequency hopping system or power control scheme for added security and robustness.

Micro-processor 792 may have a user interface means such as an audio or visual display to provide a user with a range measurement. In addition micro-processor 792 may convey range or other information to another location via an optional data bus 795 as part of a comprehensive system that relies on tracking or positioning input, or for another purpose.

Exemplary beacon-locator apparatus 700 has two channels, first (H-field) receiver channel 722 and second (E-field) receiver channel 742. Additional channels may be preferred if better performance is desired at the cost of additional complexity and expense. Such additional channels could be used to detect E-field and H-field components in alternate polarizations including but not limited to polarization components longitudinal to a direction of an incident electromagnetic signal 715. Thus beacon-locator apparatus 700 could be less dependent upon a particular orientation of an incident electromagnetic signal 715 and thereby offer more robust performance. These same benefits also accrue for locators that are not combined with beacons to form beacon-locators.

Combined Beacon-Locator in Beacon Mode

When beacon-locator apparatus 700 operates in a beacon mode, micro-processor 792 triggers transmit-receive switch 728 to connect transmitter 712 to antenna 732. Micro-processor 792 also sets an appropriate frequency for a transmitter 712. Exemplary beacon-locator apparatus 700 uses electric antenna 732 as a beacon transmit antenna. Magnetic antenna 730 could just as readily be used. The choice of antenna to be used for transmission operation in a beacon mode depends upon several factors including, for example, pattern, performance in proximity of other objects, polarization, matching, and propagation environment.

Remote beacon-locator apparatus 710 includes an electric antenna 735 and a magnetic antenna 733. Transmitter 712 sends an RF signal to transmit antenna 732. Transmit antenna 732 radiates an electromagnetic signal 716 that is received by electric antenna 735 and by magnetic antenna 733 when remote beacon-locator apparatus 710 operates in a locator mode. Remote beacon-locator apparatus 710 receives an H-field signal from magnetic antenna 733 and receives an E-field signal from electric antenna 735 thus allowing remote beacon-locator apparatus 710 to determine range r to beacon-locator apparatus 700.

An optional data bus 795 allows beacon-locator apparatus 700 to interact and coordinate with remote beacon-locator apparatus 710. For example, beacon-locator apparatus 700 can trigger remote beacon-locator apparatus 710 to cause remote beacon-locator apparatus 710 to transmit and allow beacon-locator apparatus 700 to determine range r to remote beacon-locator apparatus 710. An appropriate trigger might, for example, include data regarding a communication frequency, a frequency-hopping pattern, power control feedback or another characteristics of a transmit signal to be radiated from remote beacon-locator apparatus 710. A trigger might further include identification or authentication information.

Transmitter 712 may be controlled by micro-processor 792 to modulate electromagnetic signal 716 with information. A wide variety of modulation techniques are possible. Binary phase shift key (BPSK) is one preferred modulation option. BPSK is advantageous because of its simplicity. Further, because the present invention relies on a relative difference between electric and magnetic field phases, a common mode phase shift (such as happens with BPSK and similar modulations) does not effect the ability of the present invention to measure range r. Such information may include identifying or authentication information, or other information or telemetry of value to a user.

Antenna Configurations

FIGS. 8-11 reveal a variety of antenna configurations for ranging systems 800, 900, 1000, 1100. FIG. 8 is a schematic illustration of a representative antenna configuration for a near-field ranging system having a vertical polarization beacon and a vertical polarization omni-directional locator. In FIG. 8, ranging system 800 includes a vertical polarization beacon 810 and locator 820. A vertical polarization antenna 836 associated with vertical polarization beacon 810 is typically a vertically oriented whip or dipole antenna, but could be a loop or loopstick antenna oriented to radiate vertically polarized electromagnetic signals 815 in a desired direction. In many applications an omni-directional coverage of a single vertically oriented whip is preferred to a more directional pattern of a traditional vertically polarized loop. Locator 820 includes an electric antenna 832, a first magnetic antenna 831, and a second magnetic antenna 833 oriented perpendicularly to first magnetic antenna 831. Electric antenna 832 is typically a vertically oriented whip or dipole antenna. First magnetic antenna 831 and second magnetic antenna 833 are typically loop or loopstick antennas oriented to be responsive to vertically polarized electromagnetic signal 815. Locator 820 can select either first magnetic antenna 831 or second magnetic antenna 833 to optimize a received (H-field) signal. Locator 820 may also use signals from both first magnetic antenna 831 and second magnetic antenna 833.

FIG. 9 is a schematic illustration of a representative antenna configuration for a near-field ranging system having a horizontal polarization beacon and a horizontal polarization omni-directional locator. In FIG. 9, ranging system 900 includes a horizontal polarization beacon 910 and locator 920. A horizontal polarization antenna 937 associated with horizontal polarization beacon 910 is typically a vertically oriented loopstick or loop antenna oriented in a horizontal plane, but could be a whip or dipole antenna oriented to radiate horizontally polarized electromagnetic signals 915 in a desired direction. In many applications the omni-directional coverage of a single loop or loopstick antenna is preferred to a more directional pattern of a traditional horizontally polarized whip or dipole antenna. Locator 920 includes a magnetic antenna 931, a first electric antenna 932, and a second electric antenna 934. Magnetic antenna 931 is typically a vertically oriented loopstick or loop antenna oriented in a horizontal plane. First electric antenna 932 and second electric antenna 934 are typically dipole or whip antennas oriented to be responsive to horizontally polarized electromagnetic signals 915. Locator 920 can select either first electric antenna 932 or second electric antenna 934 to optimize a received (E-field) signal. Locator 920 may also use signals from both first electric antenna 932 and second electric antenna 934.

FIG. 10 is a schematic illustration of a representative antenna configuration for a near-field ranging system having a vertical polarization beacon and a vertical polarization directional locator. In FIG. 10, ranging system 1000 includes a vertical polarization beacon 1010 and locator 1020. A vertical polarization antenna 1036 associated with vertical polarization beacon 1010 is typically a vertically oriented whip or dipole antenna oriented in a vertical plane, but could be a loop or loopstick antenna oriented to radiate vertically polarized electromagnetic signals 1015 in a desired direction. In many applications the omni-directional coverage of a single vertically oriented whip antenna is preferred to a more directional pattern of a traditional vertically polarized loop antenna. Locator 1020 includes an electric antenna 1032 and a magnetic antenna 1031. Electric antenna 1032 is typically a vertically oriented whip or dipole antenna. Magnetic antenna 1031 is typically a loop or loopstick antenna oriented to be responsive to vertically polarized electromagnetic signals 1015. Locator 1020 typically must be oriented to optimize a signal from magnetic antenna 1031. Additionally, the direction of arrival of electromagnetic signal 1015 can be determined by orienting a null of magnetic antenna 1031 with the direction of arrival of electromagnetic signal 1015 and observing an associated decrease in an RSSI level. If the responses of magnetic antenna 1031 and electric antenna 1032 are summed, the direction of arrival of electromagnetic signal 1015 can be determined by orienting a null of an effective summed pattern with a direction of arrival of electromagnetic signal 1015 and observing an associated decrease in amplitude of the summed responses.

FIG. 11 is a schematic illustration of a representative antenna configuration for a near-field ranging system having a horizontal polarization beacon and a horizontal polarization directional locator. In FIG. 11, ranging system 1100 includes a horizontal polarization beacon 1110 and locator 1120. A horizontal polarization antenna 1137 associated with horizontal polarization beacon 1110 is typically a loopstick antenna oriented vertically or a loop antenna oriented in a horizontal plane, but could be a whip or dipole antenna oriented to radiate horizontally polarized electromagnetic signals 1115 in a desired direction. In many applications the omni-directional coverage of a single loop or loopstick antenna is preferred to a more directional pattern of a traditional horizontally polarized whip or dipole antenna. Locator 1120 includes an electric antenna 1132 and a magnetic antenna 1131. Electric antenna 1132 is typically a horizontally oriented whip or dipole antenna. Magnetic antenna 1131 is typically a loop or loopstick antenna oriented to be responsive to horizontally polarized electromagnetic signals 1115. Locator 1120 typically must be oriented to optimize a signal from electric antenna 1132. Additionally, the direction of arrival of electromagnetic signal 1115 can be determined by orienting a null of electric antenna 1132 with the direction of arrival of electromagnetic signal 1115 and observing an associated decrease in an RSSI level. If the responses of magnetic antenna 1131 and electric antenna 1132 are summed, the direction of arrival of electromagnetic signal 1115 can be determined by orienting a null of an effective summed pattern with a direction of arrival of electromagnetic signal 1115 and observing an associated decrease in amplitude of the summed responses.

A choice of polarization may be influenced by specifics of a particular propagation environment, by the presence of potentially interfering signals of a particular polarization, or by the requirements of a particular application. Vertical polarization is typically preferred for propagation in an environment where undesired coupling tends to be horizontal, such as near ground. Horizontal polarization is typically preferred for propagation in an environment where undesired coupling is vertical such as through vertically oriented steel members. Circular polarization is typically preferred for systems where orientation independence is important. Some such coupling may actually be desirable if this coupling tends to guide waves in a desired direction.

Important antenna parameters for designing ranging systems according to the present invention include antenna patterns, matching, form factors, performance and cost. Another important critical parameter is capturing and differentiating between an electric and a magnetic component of an incident electromagnetic signal. A wide variety of suitable antenna options are known to those skilled in the RF arts.

Exemplary Receiver

The inventors have implemented a ranging system as taught by the present invention. This system operated at 10.7 MHz and exhibited ranging accuracies within inches from about 5 ft to about 35 ft. Since the wavelength ($\lambda$) at 10.7 MHz is 92 ft, this corresponds to about $0.054\lambda$ to $0.38\lambda$. According to the teachings of the present invention, significantly longer ranges are possible by utilizing significantly lower frequencies.

Figure 12:
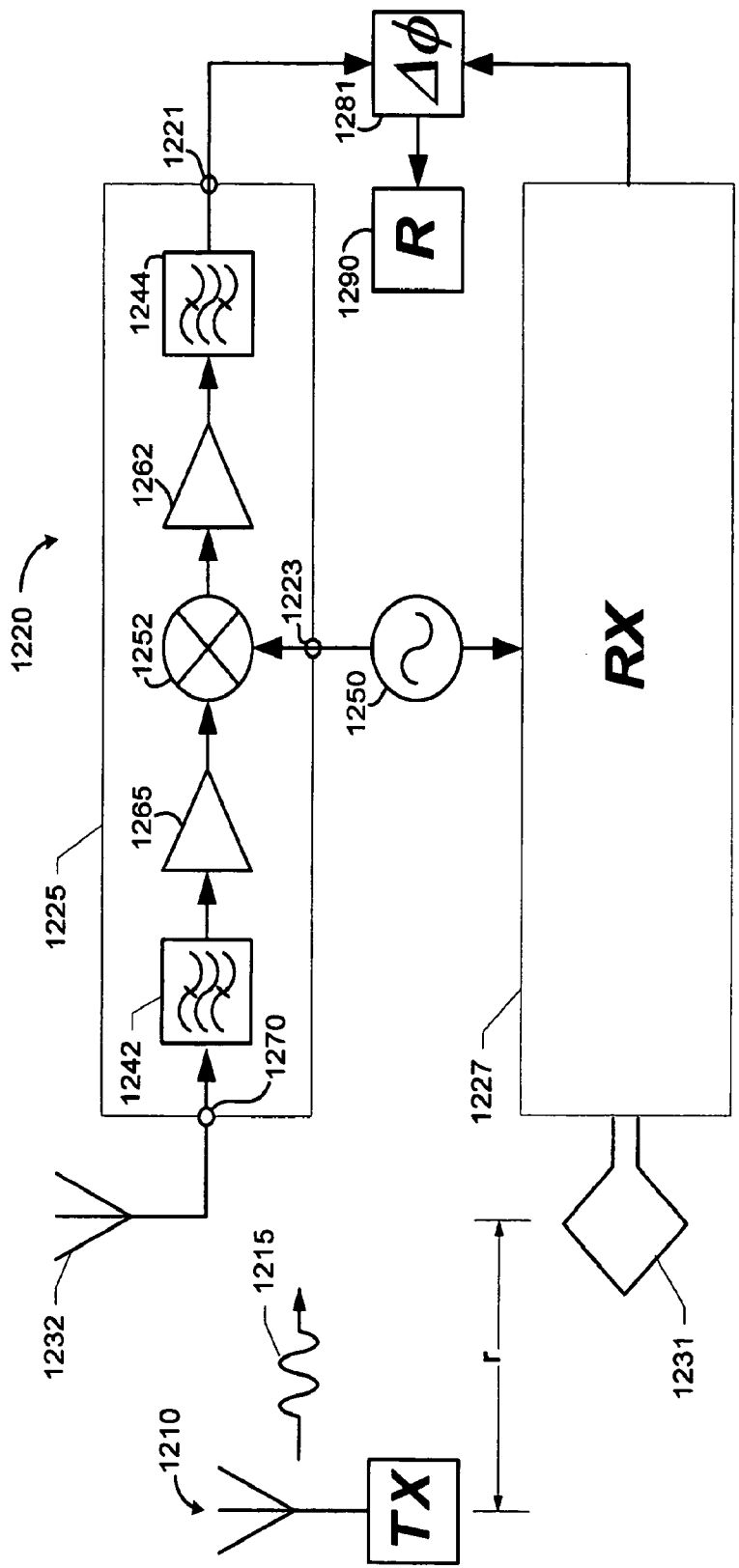
FIG. 12 is a schematic diagram illustrating details of an exemplary receiver in a system for electromagnetic ranging.

FIG. 12 is a schematic diagram illustrating details of an exemplary receiver in a system for electromagnetic ranging. In FIG. 12, a ranging system 1200 includes a beacon 1210 and a locator 1220. Beacon 1210 transmits an electromagnetic signal 1215 that is received by locator 1220. Locator 1220 includes an electric antenna 1232 that is sensitive to the electric component of electromagnetic signal 1215. Electric antenna 1232 detects a first (electric or E-field) signal proportional to the electric component of electromagnetic signal 1215 and conveys the first signal to an antenna port 1270 of a first receiver 1225 included in locator 1220. Locator 1220 also includes a magnetic antenna 1231 that is sensitive to the magnetic component of electromagnetic signal 1215. Magnetic antenna 1231 detects a second (magnetic or H-field)

signal proportional to the magnetic component of electromagnetic signal 1215 and conveys the second signal to a second receiver 1227 included in locator 1220. Second receiver 1227 is constructed in substantial similarity to receiver 1225; details of construction of receiver 1227 are omitted in FIG. 12 in order to simplify the description of ranging system 1200.

Exact spacing between electric antenna 1232 and magnetic antenna 1231 is not critical, providing that spacing is large enough to avoid undesired mutual coupling and spacing is small relative to the wavelength λ of electromagnetic signal 1215. The inventors have arranged electric antenna 1232 and magnetic antenna 1231 separated by a distance on the order of 1%-3% of a wavelength (0.03λ-0.01λ). In alternate embodiments, electric antenna 1232 and magnetic antenna 1231 may be arranged in a single integral unit with a first terminal yielding an E-field response and a second terminal yielding an H-field response. Although spacing between antennas is preferentially small relative to the wavelength λ of electromagnetic signal 1215, a larger spacing between electric antenna 1232 and magnetic antenna 1231 may be tolerated if phase detector 1280 or range detector 1290 in locator 1220 are compensated for the effect of the larger spacing.

Locator 1220 also includes a pre-select filter 1242 that receives the first (electric) signal from antenna port 1270. Pre-select filter 1242 passes the first (electric) signal in a desired band, but rejects signals with undesirable frequencies. Typically pre-select filter 1242 will pass a band of frequencies within which beacon 1210 might transmit an electromagnetic signal 1215 for a relevant application. Selection of a band will depend upon a variety of factors including, but not necessarily limited to, regulatory constraints, propagation behavior of an electromagnetic signal 1215, and a desired range r of operation. The present invention offers optimal performance for a desired range r of operation approximately constrained by 0.08λ to 0.30λ, where λ is the wavelength of the electromagnetic signal 1215 transmitted by beacon 1210. A typical operating range is generally within 0.05λ to 0.50λ. Higher performance implementations of the present invention may operate at ranges r less than 0.05λ and greater than 0.50λ.

A front-end-amplifier 1265 increases the amplitude of the first (electric) signal. If atmospheric and other noise are sufficiently low, it is advantageous for an amplifier to have a noise figure sufficiently low to avoid introducing undesired noise, a dynamic range large enough to accommodate the potential variation in amplitude of the first (electric) signal, and a gain sufficient to yield a suitably large amplitude first (electric) signal so that a weak signal will properly drive phase detector 1281. The inventors have advantageously used a Mini-Circuits ZFL-500 amplifier as a front-end-amplifier 1265, but a wide variety of other amplifiers are suitable.

A mixer 1252 mixes the first (electric) signal with a local oscillator (LO) signal generated by a local oscillator 1250 thus yielding a first intermediate frequency (IF) signal. Local oscillator 1250 may be a traditional sine wave oscillator. Local oscillator 1250 may also be a direct digital synthesizer (DDS), or other waveform template generator. For instance, the inventors have used an Analog Devices DDS (AD 9835) as local oscillator 1250 and a Mini-Circuits SBL-3 mixer as mixer 1252. A wide variety of alternate implementations are possible.

An IF amplifier 1262 increases the amplitude of the first IF signal. The inventors have found that a pair of current feedback operational amplifiers providing about +50 dB of gain were a suitable embodiment of IF amplifier 1262, but a wide variety of alternatives are available to practitioners of the RF arts.

An IF filter 1244 accepts only the desired first IF signal and rejects other undesired signals. A crystal filter may be advantageously used as IF filter 1244. Such a crystal filter is characterized by an extremely narrow pass band, and preferably has a constant group delay within the pass band. A narrow pass band acts so as to allow the desired first IF signal to be conveyed to phase detector 1281 while rejecting adjacent undesired signals and noise.

Local oscillator 1250 may also be advantageously used as a tuner to select among a plurality of electromagnetic signals transmitted by a plurality of beacons 1210. A particular beacon 1210 emitting a particular electromagnetic signal may be distinguished from other beacons emitting other electromagnetic signals, where other signals have slightly different frequencies. Thus a single locator 1220 may track a large number of different beacons 1210. A variety of other schemes for tracking multiple beacons are possible, including for example, time division multiple access, code division multiple access, frequency hopping, or other schemes for achieving a desired channelization. Similarly, a large number of different locators 1220 may measure ranges to a particular beacon 1210. Local oscillator 1250 may be considered as a component of an individual receiver 1225 or 1227 or as a common frequency standard for a plurality of receivers 1225, 1227.

Phase detector 1281 accepts the first IF signal from first receiver 1225 and a second IF signal from second receiver 1227 and generates an output voltage proportional to a phase difference between the first IF signal and the second IF signal. For purposes of illustration and not limitation, one exemplary embodiment of phase detector 1280 is an Analog Devices AD 8302. This particular phase detector also yields an output proportional to a magnitude difference that may help identify and correct for propagation anomalies and provide a more accurate determination of range in some circumstances.

Range detector 1290 is included in locator 1220 and accepts an input from a phase detector 1281 for determining range r between beacon 1210 and locator 1220. The inventors used a Measurement Computing Corporation PC-Card-DAS 16/16 A/D PCMCIA Card and a notebook computer to embody range detector 1290, but there are a great many ways one skilled in the RF arts could implement range detector 1290.

The present invention offers good performance for a desired range of operation approximately within ranges r between 0.05λ and 0.50λ away, and more optimal performance was achieved within a range r between 0.08λ and 0.30λ where λ is the wavelength of electromagnetic signal 1215 transmitted by beacon 1210. Higher performance implementations of the present invention may operate at ranges r less than 0.05λ and greater than 0.50λ.

Fixed Beacon-Mobile Locator Architecture

Figure 13:
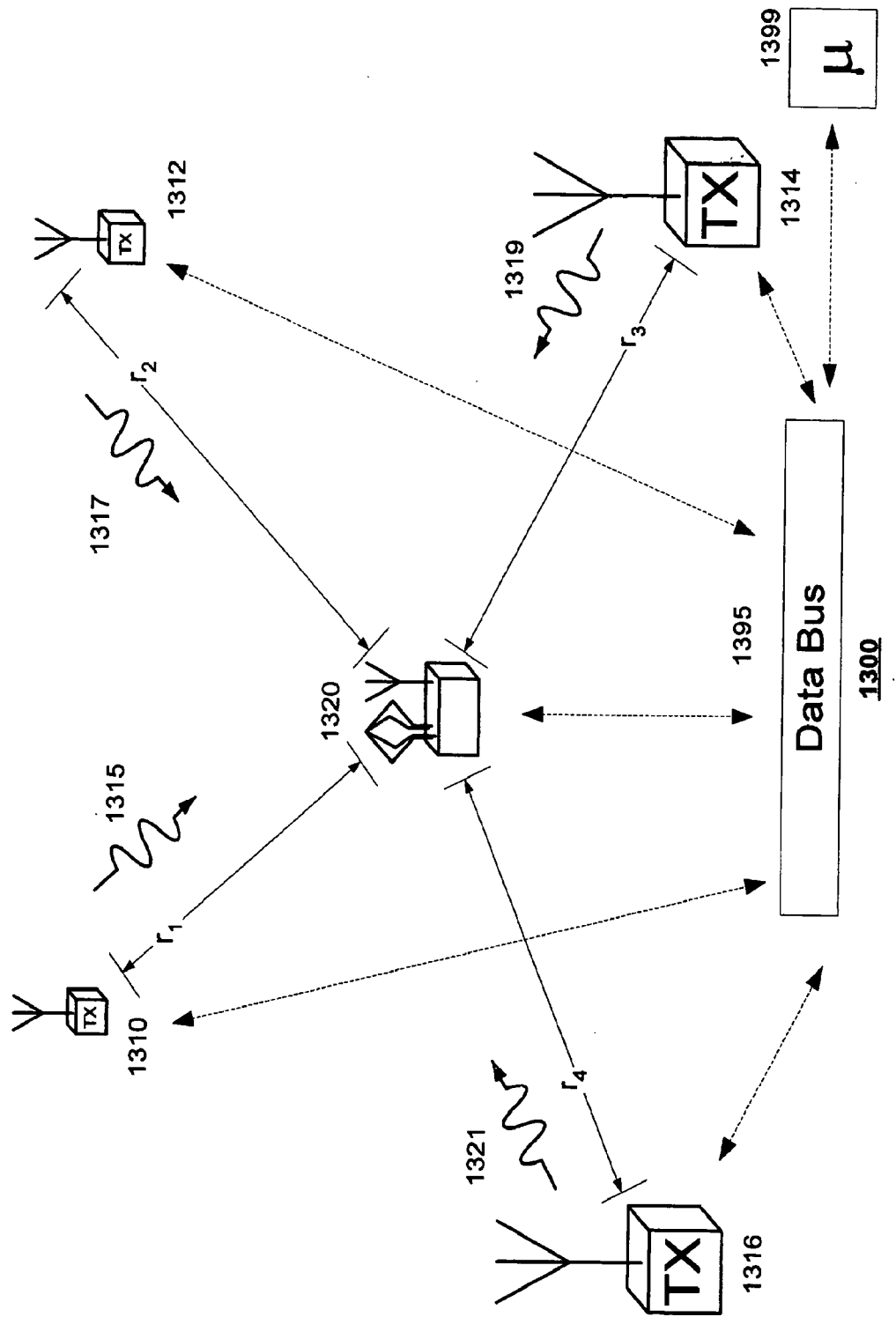
FIG. 13 is a schematic diagram illustrating a near-field ranging system configured according to a fixed beacon-mobile locator architecture.

FIG. 13 is a schematic diagram illustrating a near-field ranging system configured according to a fixed beacon-mobile locator architecture. In FIG. 13, a fixed beacon-mobile locator ranging system 1300 includes a first beacon 1310 in a first known, fixed position transmitting a first electromagnetic signal 1315. A locator 1320 receives first electromagnetic signal 1315 and determines a first range $r_1$. A second beacon 1312 in a second known, fixed position transmits a second electromagnetic signal 1317. Locator 1320 receives second electromagnetic signal 1317 and determines a second range $r_2$. A third beacon 1314 in a third known, fixed position transmits a third electromagnetic signal 1319. Locator 1320 receives third electromagnetic signal 1319 and determines a third range $r_3$. A fourth beacon 1316 in a fourth known, fixed position transmits a fourth electromagnetic signal 1321. Locator 1320 receives fourth electromagnetic signal 1321 and determines a fourth range $r_4$. Electromagnetic signals 1315, 1317, 1319, 1321 may be substantially similar electromagnetic signals with substantially similar frequencies, or may be a variety of electromagnetic signals with different frequencies. Electromagnetic signals 1315, 1317, 1319, 1321 may be transmitted substantially contemporaneously or at different times. For example, beacon 1310 may simultaneously transmit a low frequency signal suitable for a long range and a high frequency signal suitable for a short range. Using ranges $r_1$, $r_2$, $r_3$, $r_4$, locator 1320 can determine its position. For purposes of explanation and not for limitation, four beacons 1310, 1312, 1314, 1316 have been illustrated. One beacon is sufficient to yield useful range information for some applications. Two beacons can yield a position in two dimensions subject to an ambiguity, three beacons can yield an unambiguous position in two dimensions or an ambiguous position in three dimensions, and four beacons yield an unambiguous position in three dimensions. With additional beacons providing ranges, one can obtain a more accurate position for locator 1320 using multilateration techniques known to those skilled in the RF arts.

Locator 1320 can also convey range and other useful information via an optional data bus 1395 to a central controller 1399 for analysis. Central controller 1399 can then relay position or other information via data bus 1395 back to locator 1320. A centrally coupled (i.e., coupled to all components of ranging system 1300) controller 1399 or locator 1320 can coordinate frequency of operation or other operational parameters of locator 1320 and beacons 1310, 1312, 1314, 1316. Such coordination may include operating at appropriate frequencies to avoid interference or to obtain optimal range information. Coordination may also include scheduling time or duty cycle of operation. Coordination may further include control of transmit power for coexistence, signal security, or other reasons.

Fixed beacon-mobile locator system 1300 is advantageous when one wishes to track a limited number of assets, or if one wishes position, location, navigation, or guidance information to be available at a potentially large number of mobile locations. Fixed beacon-mobile locator system 1300 is suitable for providing a user (with a locator 1320) with fast updates of position within an area around or throughout which a plurality of beacons (e.g., beacons 1310, 1312, 1314, 1316) have been deployed. A variety of applications are possible. For purposes of illustration and not for limitation, a few applications are listed below.

For example, fixed beacons 1310, 1312, 1314, 1316 may be deployed in and around a golf course, a lawn, a farm, or another area in which precision guidance of equipment is desired. Locator 1320 may be placed on a robotic tractor, mower, golf ball gatherer, harvester, fertilizer, or other equipment. Locator 1320 may be used in a guidance or navigation system for such equipment. Locator 1320 may also be used to keep track of golf carts, or other assets. Locator 1320 may be used to assist golfers or others in determining their location and in particular their location relative to a golf hole or another landmark of interest.

Fixed beacons 1310, 1312, 1314, 1316 may be deployed in and around a mall, store, museum, business, amusement park, urban area, park, wilderness area, harbor, lake, property, home, apartment or another area or facility in which one wishes individuals or equipment to be able to monitor their location or position. Locator 1320 may be carried by an individual so that an individual may monitor his or her own location or a location of another individual (such as a family member, friend, or other individual of interest). Locator 1320 may also be carried by an individual so that an individual may determine their location relative to a landmark or other point or points of interest. Locator 1320 may be incorporated in a device that provides a user with location-specific information such as a price or other information pertinent to a nearby object for sale, review, or evaluation. Locator 1320 may be incorporated in a device that provides a user with location-specific information describing a nearby attraction, display, exhibit, hazard, or other feature of potential interest.

Locator 1320 may be incorporated into a vehicle to provide position, guidance, or navigation information. An example is a precision guidance or navigation system for aircraft such as unmanned aerial vehicles (UAV), boats, automobiles, unmanned ground vehicles (UGV) or other vehicles.

Fixed/Mobile Locator-Mobile Beacon Architecture

Figure 14:
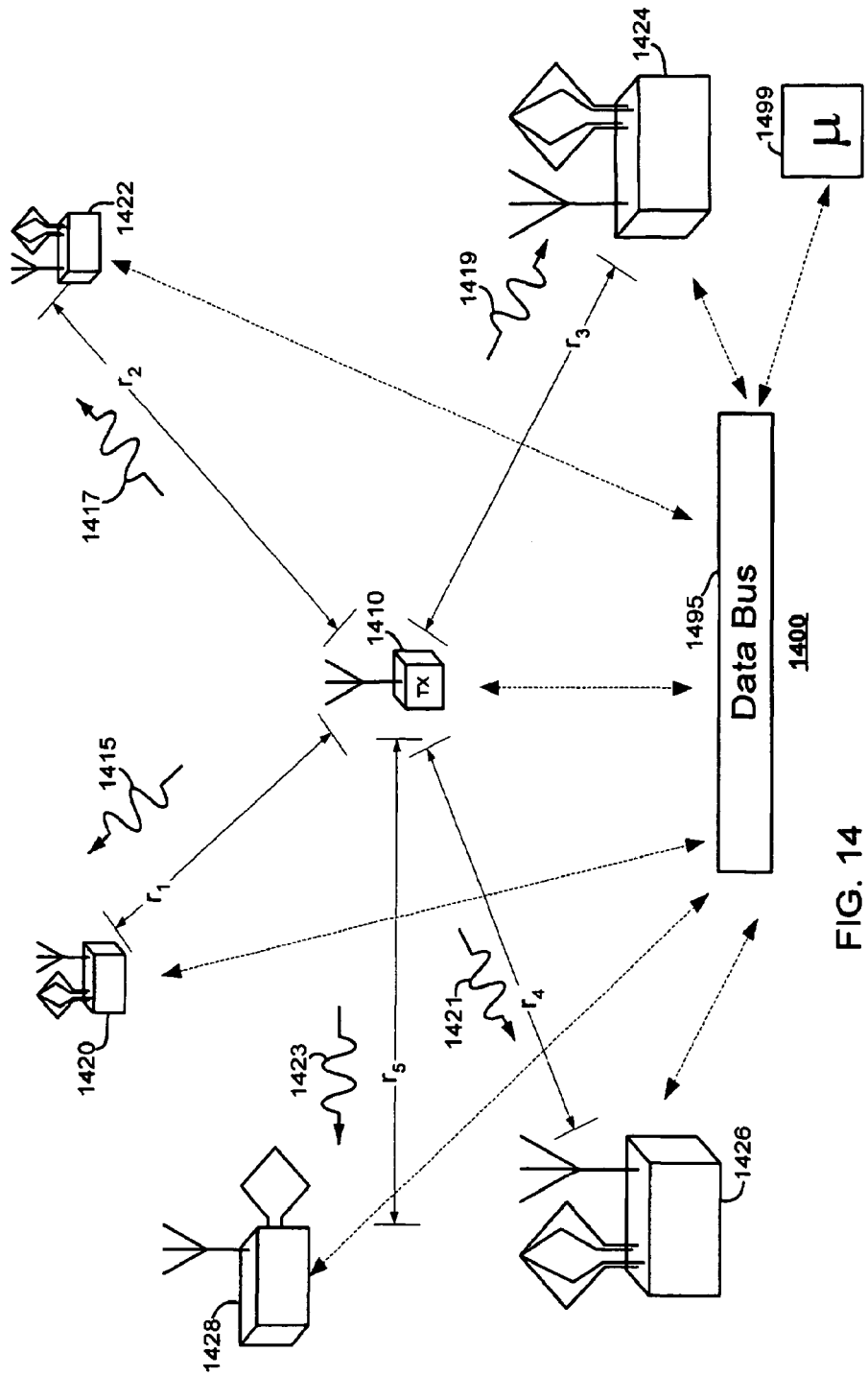
FIG. 14 is a schematic diagram illustrating a near-field ranging system configured according to a fixed/mobile locator-mobile beacon architecture.

FIG. 14 is a schematic diagram illustrating a near-field ranging system configured according to a fixed/mobile locator-mobile beacon architecture. In FIG. 14, a fixed/mobile locator-mobile beacon ranging system 1400 includes a mobile beacon 1410 transmits a first electromagnetic signal 1415, a second electromagnetic signal 1417, a third electromagnetic signal 1419, a fourth electromagnetic signal 1421, and a fifth electromagnetic signal 1423. Electromagnetic signals 1415, 1417, 1419, 1421, 1423 may be substantially similar electromagnetic signals with substantially similar frequencies, or a variety of electromagnetic signals with different frequencies. Electromagnetic signals 1415, 1417, 1419, 1421, 1423 may be transmitted at a substantially similar time or at different times. For example, mobile beacon 1410 may simultaneously transmit a low frequency signal suitable for a long range and a high frequency signal suitable for a short range.

A first fixed locator 1420 receives first electromagnetic signal 1415 and determines a first range $r_1$. A second fixed locator 1422 receives second electromagnetic signal 1417 and determines a second range $r_2$. A third fixed locator 1424 receives third electromagnetic signal 1419 and determines a third range $r_3$. A fourth fixed locator 1426 receives fourth electromagnetic signal 1421 and determines a fourth range $r_4$. A fifth mobile locator 1428 receives fifth electromagnetic signal 1423 and determines a fifth range $r_5$. For purposes of illustration, fifth mobile locator 1428 is shown as a directional locator of the sort described as directional locator 1020 (FIG. 10), but fifth mobile locator 1428 could as readily be an omni-directional locator of the sort described as omni-directional locator 820 (FIG. 8).

For purposes of explanation and not for limitation, four fixed locators 1420, 1422, 1424, 1426 and one mobile locator 1428 are illustrated in FIG. 14. A single locator is sufficient to yield useful range information for some applications. For example, a single mobile locator 1428 can enable a user to ascertain range $r_5$ from mobile beacon 1410, thus allowing the user to home in on mobile beacon 1410. Two locators can yield a position in two dimensions subject to an ambiguity, three locators can yield an unambiguous position in two dimensions or an ambiguous position in three dimensions, and four locators yield an unambiguous position in three dimensions. With additional locators providing ranges one can obtain a more accurate position for beacon 1410 using multilateration techniques known to those skilled in the RF arts.

When a data bus 1495 is included in ranging system 1400, locators 1420, 1422, 1424, 1426, 1428 may transmit ranges $r_1$, $r_2$, $r_3$, $r_4$, $r_5$ via data bus 1495 to a central controller 1499 or another device (not shown in FIG. 14) connected to data bus 1495. Central controller 1499 can gather ranges $r_1$, $r_2$, $r_3$, $r_4$, $r_5$, calculate a position of beacon 1410, and relay that position information to any other device connected to data bus 1495. Central controller 1099 (or another device connected to data bus 1495) can coordinate a frequency of operation or other operational parameters of mobile beacon 1410 and locators 1420, 1422, 1424, 1426, 1428. Such coordination may include operating at appropriate frequencies to avoid interference or to obtain optimal range information. Coordination may also include scheduling time or duty cycle of operation. Coordination may further include control of transmit power for coexistence, signal security, or other reasons.

Ranging system 1400 is particularly well configured for tracking large numbers of assets including, for example, tracking people or assets from a central location. A variety of applications are possible. For purposes of illustration and not for limitation, a few applications are listed below.

For example, a plurality of fixed locators (e.g., locators 1420, 1422, 1424, 1426) may be deployed in and around a particular area of interest within which one wishes to track a plurality of beacons (e.g., beacon 1410) attached to assets of interest. Ranging system 1400 is well suited for tracking cars, rental equipment, parts, components, tools or other assets in a manufacturing facility, a retail lot, warehouse, hold, vehicle, cargo container, storage area, hospital, or other facility in which one desires to track assets. A respective mobile beacon 1410 may be placed in each car, piece of rental equipment, part, component, tool, or other asset whose location is desired to be known. If a respective mobile beacon 1410 is removed from an area in and around which an infrastructure of fixed locators have been placed, then a mobile locator (e.g., mobile locator 1428) may be used to help locate the wandering mobile beacon 1410. This functionality is of particular utility if a wandering mobile beacon 1410 is attached to stolen property. A locator such as locator 1420 may be associated with a traffic signal, toll booth, or other traffic related infrastructure and may monitor a respective mobile beacon 1410 in an approaching emergency vehicle, bus, or car thus allowing precision control of a traffic signal, or other monitoring of the situation. It is useful to note here that electromagnetic signals associated with ranging system 1400 may be modulated to include information, such as identifying information relating to an asset to which a mobile beacon is attached. In such manner, various assets bearing respective mobile beacons 1410 may be individually identified or authenticated within ranging system 1400.

Further, a plurality of fixed locators (e.g., locators 1420, 1422, 1424, 1426) may be deployed in and around a particular area of interest within which one wishes to track a plurality of beacons (e.g., beacon 1410) attached or associated with people. Thus, ranging system 1400 is well suited for tracking emergency responders such as firefighting, police, SWAT team members, and medical personnel at an incident scene. Ranging system 1400 can be used to track employees in a hazardous environment like miners in a mine, workers at a facility where hazardous materials are present, or corrections officers or prisoners in a prison. Ranging system 1400 may also be used to track patients, doctors, or other key personnel or equipment in a hospital, nursing home, or other institution.

In still another exemplary application, ranging system 1400 may track skiers at a ski area, allowing skiers to be readily located even in case of an avalanche or other emergency. Similar applications include tracking hikers, climbers, skydivers, hunters, fishermen, outdoorsmen, and others who engage in potentially dangerous activities and might require rescue or assistance.

Patrons may be tracked at an amusement park, museum, festival, sporting event, convention, meeting, or other assembly drawing crowds. Sports competitors such as football players, soccer players, baseball players, swimmers, runners, and participants in other sports may have their positions monitored to assist in officiating, coverage, or analysis of a sporting event. Sporting equipment or animals might be tracked, including, by way of example and not by way of limitation, footballs, baseballs, soccer balls, rugby balls, race cars, yachts, thoroughbreds, or greyhounds.

Key personnel may be located in a business or other facility. Children and others requiring supervision may be monitored around a home, neighborhood, school, campus, or other facility. Ranging system 1400 is also applicable to a personal emergency response system (PERS), allowing rescuers to quickly locate an individual in need of assistance, such as a patient who has wandered away from a nursing home. Prisoners may be tracked as part of a home release or other low security supervision program. Persons subject to restraining orders or other restrictions on their movements may be monitored to prevent their violating terms of their restrictions. A mobile locator (e.g., mobile locator 1428) can be used to help find a person who has left an area in and around which an infrastructure of fixed locators (e.g., fixed locators 1420, 1422, 1424, 1426) have been placed.

Ranging system 1400 may also be used to track a pet as part of a pet containment system, or to allow an owner to monitor a pet's location. Wildlife may be tracked as part of a conservation project, research effort, or for other reasons. Ranging system 1400 may also be used to track and monitor livestock or other domesticated animals.

Reciprocal Beacon-Locator

Figure 15:
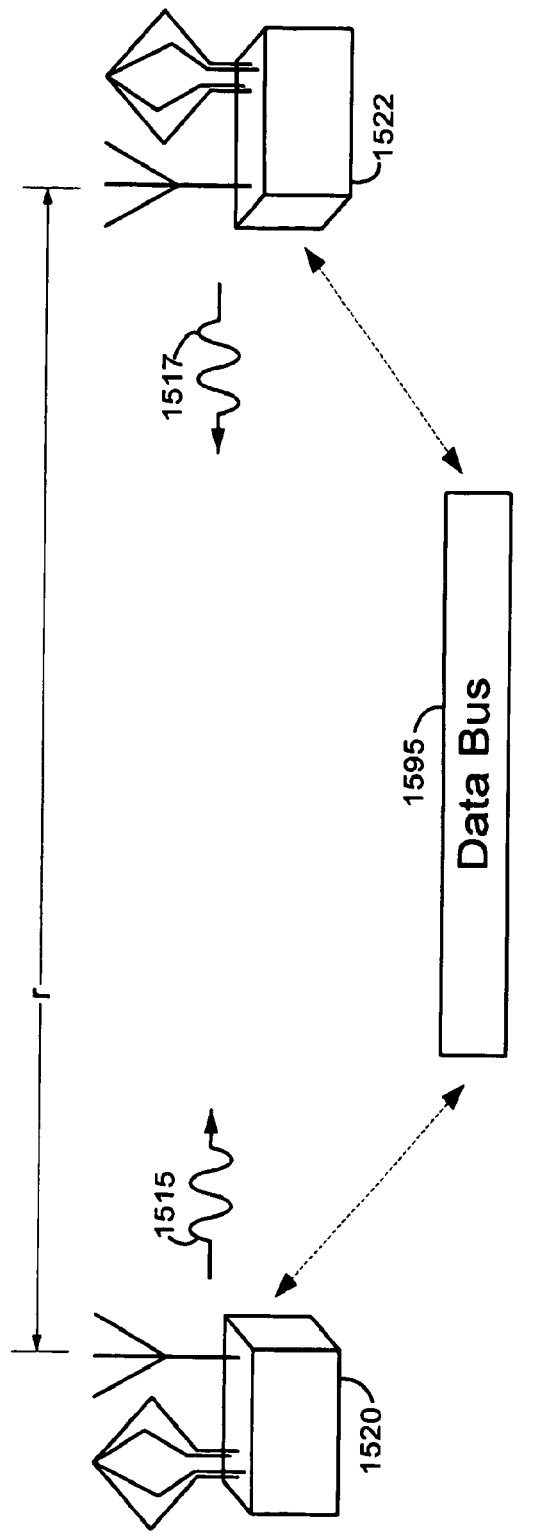
FIG. 15 is a schematic diagram illustrating a near-field ranging system configured according to a reciprocal beacon-locator architecture.

FIG. 15 is a schematic diagram illustrating a near-field ranging system configured according to a reciprocal beacon-locator architecture. In FIG. 15, a reciprocal beacon-locator ranging system 1500 includes a first beacon-locator 1520 and a second beacon locator 1522. First beacon-locator 1520 transmits a first electromagnetic signal 1515. Second beacon-locator 1522 receives first electromagnetic signal 1515 and calculates a range r from first beacon-locator 1520. Second beacon-locator 1522 may also transmit a second electromagnetic signal 1517. First beacon-locator 1520 receives second electromagnetic signal 1517 and calculates range r. If first beacon-locator 1520 and second beacon-locator 1522 are connected via an optional data bus 1595, then first beacon-locator 1520 can trigger second beacon-locator 1522 to send second electromagnetic signal 1517 so that first beacon-locator 1520 can determine range r. For purpose of illustration and not for purpose of limitation only two beacon-locators are shown. In some applications however, it may be advantageous to have additional beacon-locators so that each member of a larger group may track or be tracked. A variety of applications are appropriate for ranging system 1500. For purposes of illustration and not for limitation, a few applications are listed below. Reciprocal beacon-locator system 1500 is useful in conjunction with two-way radios whose users desire to know how far away a communicating party is situated. One may also advantageously incorporate a beacon-locator 1520, 1522 in devices that allow a plurality of people to find each other, such as parents and children at an amusement park, hunters, fishermen, or other outdoorsmen, or other devices in which combined tracking and communication within and among members of a group is desired. Such a combined tracking and communicating arrangement may be useful not only for people, but also for vehicles, particularly aircraft and ships which may need to maintain particular spacing or stations within a moving group. If a means for direction finding is also used in a particular application, then both range and bearing information may be obtained. Reciprocal beacon-locator system 1500 is also useful for allowing members of a team to monitor each other's positions when visibility is impaired by smoke or other intervening walls or objects. Further, reciprocal beacon-locator system 1500 may be employed beneficially as part of a communication security system that uses range or position information to validate or authenticate the identity of a communicating party.

Passive Tag Architecture

Figure 16:
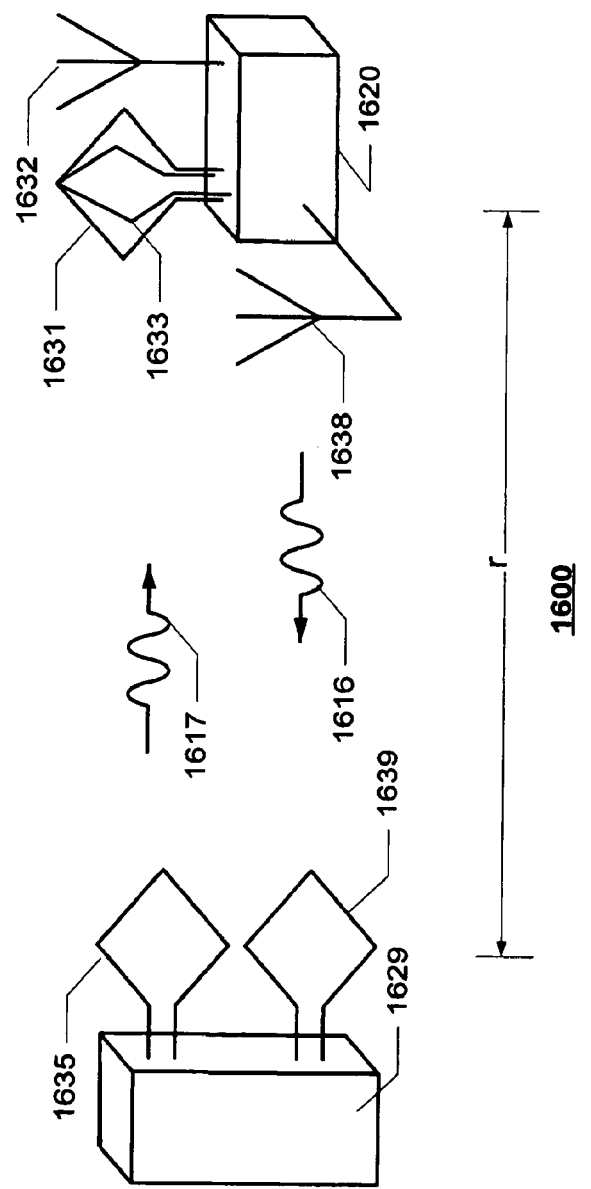
FIG. 16 is a schematic diagram illustrating a near-field ranging system configured employing a passive tag architecture.

FIG. 16 is a schematic diagram illustrating a near-field ranging system configured employing a passive tag architecture. In FIG. 16, a passive tag ranging system 1600 includes a locator 1620 equipped with an interrogator antenna 1638 that radiates an interrogatory electromagnetic signal 1616. In alternate embodiments, the function of interrogator antenna 1638 may be performed by a first magnetic antenna 1631, a second magnetic antenna 1633, or an electric antenna 1632. Interrogatory electromagnetic signal 1616 is detected by an interrogatory antenna 1639 of a passive tag 1629. Passive tag 1629 collects energy from interrogatory electromagnetic signal 1616 and re-radiates the collected energy as an electromagnetic signal 1617 via a passive tag transmit antenna 1635.

Interrogatory electromagnetic signal 1216 may have a different frequency or other different properties from re-radiated electromagnetic signal 1617. Although interrogatory antenna 1639 and passive tag transmit antenna 1635 are shown as magnetic antennas they may be embodied in electric antennas. Further, passive tag 1629 may include active means to modulate re-radiated electromagnetic signal 1617. Electromagnetic signal 1617 is detected by first magnetic antenna 1631, second magnetic antenna 1633, and electric antenna 1632. Locator 1620 then determines range r and possibly a bearing to passive tag 1629, using the near-field distance measurement teachings of the present invention.

Passive tag ranging system 1600 is a good product solution when a low cost but high volume implementation is an important goal. Passive tag 1629 may be attached to luggage, mail, assets for inventory control or theft prevention, identification cards or other personal artifacts, or a wide variety of other people or assets whose location is desired to be known with great precision.

A variety of neighboring passive tags 1629 may be distinguished from each other by responsiveness to different interrogatory electromagnetic signals 1616 or by various modulations applied to respective transmitted electromagnetic signals 1617.

Near-Field Remote Sensing Architecture

Figure 17:
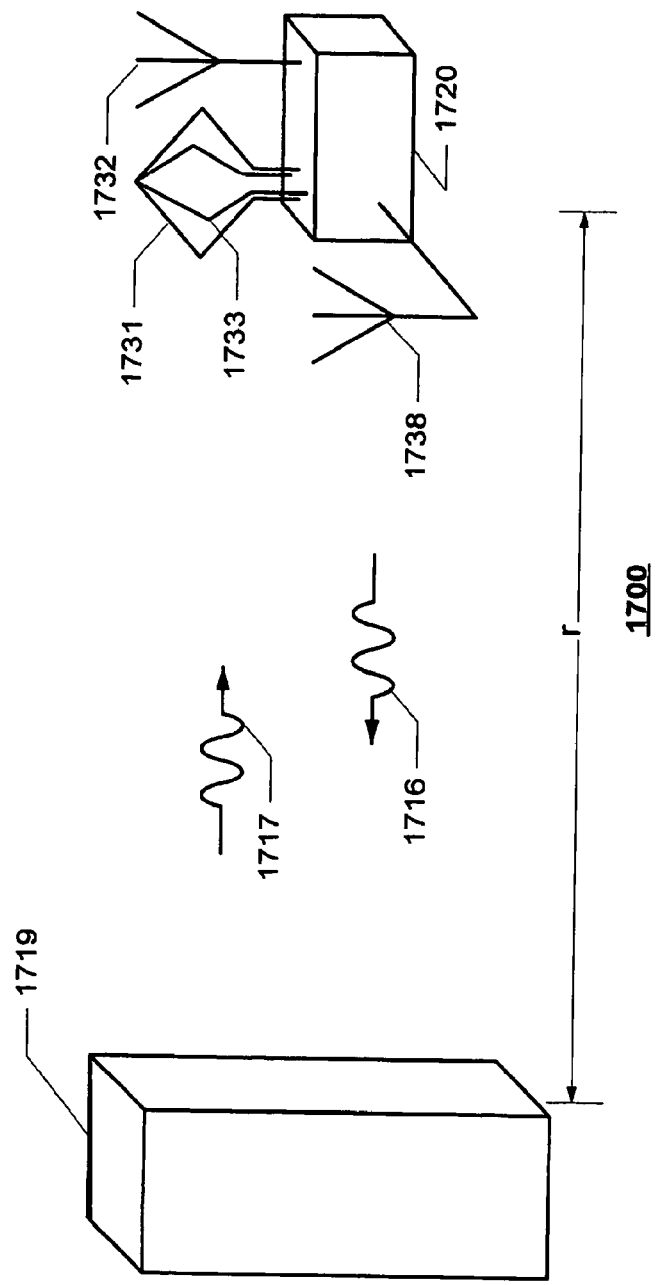
FIG. 17 is a schematic diagram illustrating a near-field ranging system configured employing a near-field remote sensing architecture.

FIG. 17 is a schematic diagram illustrating a near-field ranging system configured employing a near-field remote sensing architecture. In FIG. 17, a near-field remote sensing ranging system 1700 includes a remote near-field sensor 1720 is equipped with an interrogator antenna 1738 that radiates an interrogatory electromagnetic signal 1716. In alternate embodiments, the function of interrogator antenna 1738 may be performed by a first magnetic antenna 1731, a second magnetic antenna 1733, or an electric antenna 1732. Interrogatory electromagnetic signal 1716 is incident on a remotely sensed object 1719. A reflected electromagnetic signal 1717 results when an incident interrogatory electromagnetic signal 1716 reflects from remotely sensed object 1719. The properties of reflected electromagnetic signal 1717 are dependent upon the electrical and geometric properties of remotely sensed object 1719 as well as upon range r between near-field sensor 1720 and remotely sensed object 1719. Reflected electromagnetic signal 1717 is detected by first magnetic antenna 1731, second magnetic antenna 1733, and electric antenna 1732. Near-field sensor 1720 can evaluate reflected electromagnetic signal 1717 to infer properties of remotely sensed object 1719.

Near-Field Ranging Method

Figure 18:
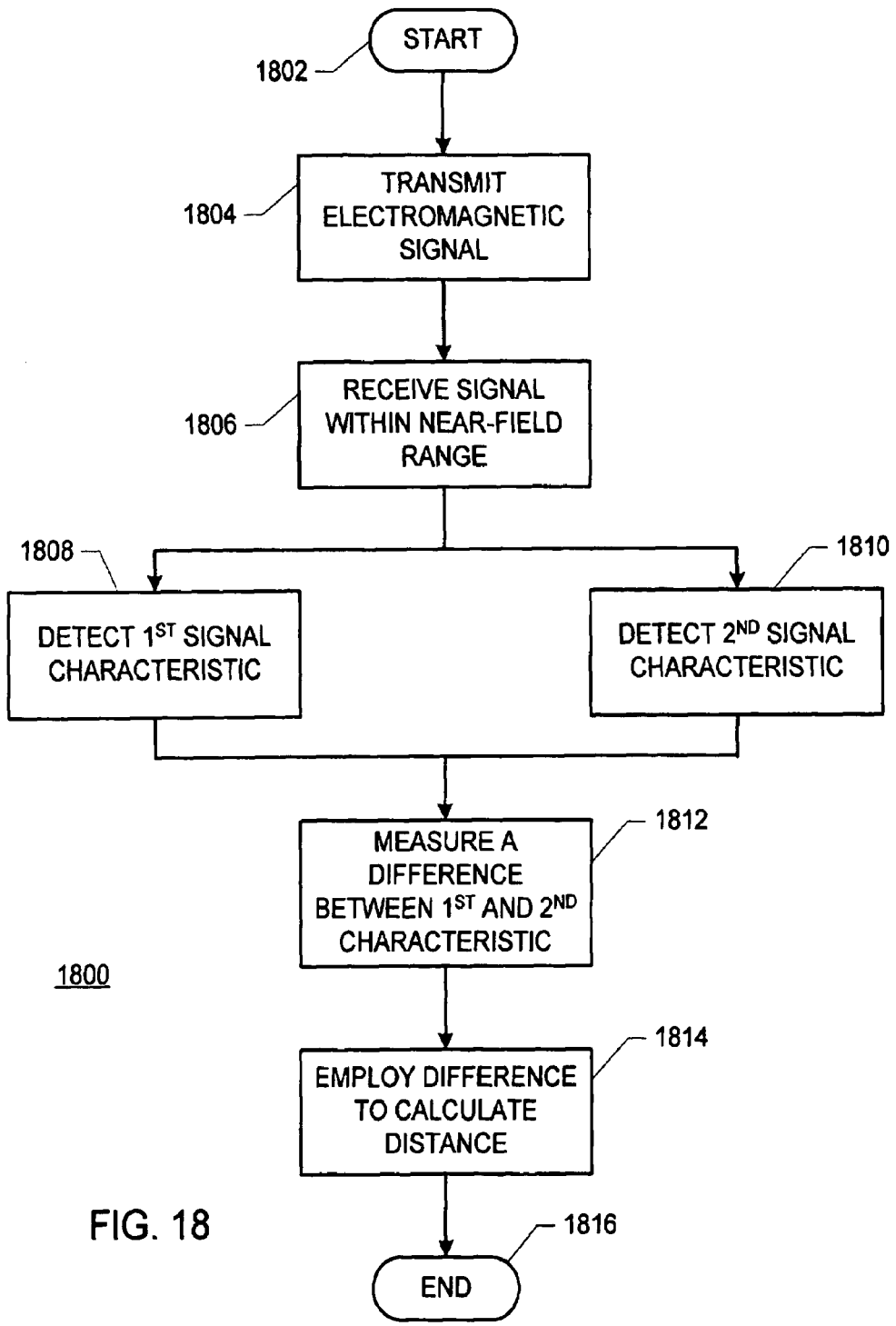
FIG. 18 is a flow diagram illustrating the method of the present invention.

FIG. 18 is a flow diagram illustrating the method of the present invention. A method 1800 for measuring distance between a first locus and a second locus begins at a START block 1802. Method 1800 continues with transmitting an electromagnetic signal from the first locus, as indicated by a block 1804. Method 18000 continues with receiving the electromagnetic wave at the second locus; the second locus being within near-field range of the electromagnetic signal, as indicated by a block 1806. Method 1800 continues with, in no particular order, (1) detecting a first characteristic of the electromagnetic signal, as indicated by a block 1808; and (2) detecting a second characteristic of the electromagnetic signal, as indicated by a block 1810. Method 1800 continues with measuring a difference between the first characteristic and the second characteristic, as indicated by a block 1812. Method 1800 continues with employing the difference measured as represented by block 1812 to calculate the distance between the first locus and the second locus, as indicated by a block 1814. Method 1800 terminates as indicated by an END block 1816.

Fixed beacon-mobile locator ranging system 1300 (FIG. 13), a fixed/mobile locator-mobile beacon ranging system 1400 (FIG. 14), reciprocal beacon-locator ranging system 1500 (FIG. 15), passive tag ranging system 1600 (FIG. 16) and near-field remote sensing ranging system 1700 (FIG. 17) are presented for illustration and not for limitation. A variety of alternate configurations and combinations of architectures are also possible. For example, fixed locators 1420, 1422, 1424, 1426 (FIG. 14) may be embodied in a beacon-locator configuration, such as beacon-locator 1520 (FIG. 15). Fixed locators 1420, 1422, 1424, 1426 (FIG. 14) may be configured to cooperatively self-survey their own respective positions to enable rapid deployment of a positioning, locating, or tracking system. The specific exemplary applications provided in connection with each respective ranging system architecture described herein should not be interpreted as precluding use of a different architecture for a given respective exemplary application.

In another example, passive tag 1629 (FIG. 16) may be used with a network of locators (e.g., fixed locators 1420, 1422, 1424, 1426; FIG. 14). In addition, nothing in this disclosure should be interpreted as precluding a ranging, positioning or locating system from using additional information to refine an estimate of position. Such other information may include, by way of example and not by way of limitation, a history of past positions or changes of position, or information from other sensors or sources. In particular, the present invention is well suited as a supplement to a GPS type tracking system. The present invention can extend the functionality of a GPS type tracking and positioning system into areas where GPS signals cannot penetrate or are unavailable. Also, the present invention may be used to achieve levels of performance not attainable using GPS alone. Nothing in this disclosure should be interpreted as precluding use of the present invention in conjunction with any other prior art techniques for tracking, positioning, or locating. Similarly, the present invention may be supplemented by prior art systems to improve the performance of the present invention in areas or at ranges where the present invention alone may not yield reliable results.

Although this disclosure has focused on a single polarization in the interest of simplicity in explaining the present invention, it should be understood that the teachings of the present invention can be readily extended to multiple polarization or polarization diverse systems with multiple parallel receive channels, including systems employing circular polarization. Various polarization capabilities permit the systems taught by the present invention to accommodate a variety of orientations between a beacon or passive tag and a locator.

To aid understanding the present invention, this disclosure has focused on a narrowband continuous wave (CW) implementation of the present invention. It should be understood that the present invention may also be implemented using multiple frequencies, time domain impulse waveforms, stepped or swept sets of appropriate frequencies, or other signals more complicated than an individual narrowband CW signal. For example, a phase difference of a CW signal may be related to a time delay, or more generally, a Hilbert transform of an arbitrary time domain signal. Any waveform (whether a CW waveform, short pulse, impulse, or time domain waveform, chirped waveform, or other waveform) will evolve from a near-field shape to a far-field shape in a manner that facilitates distance measurement and positioning according to the teachings of the present invention.

Near Field Ranging with Calibration
Near Field Propagation

Figure 19:
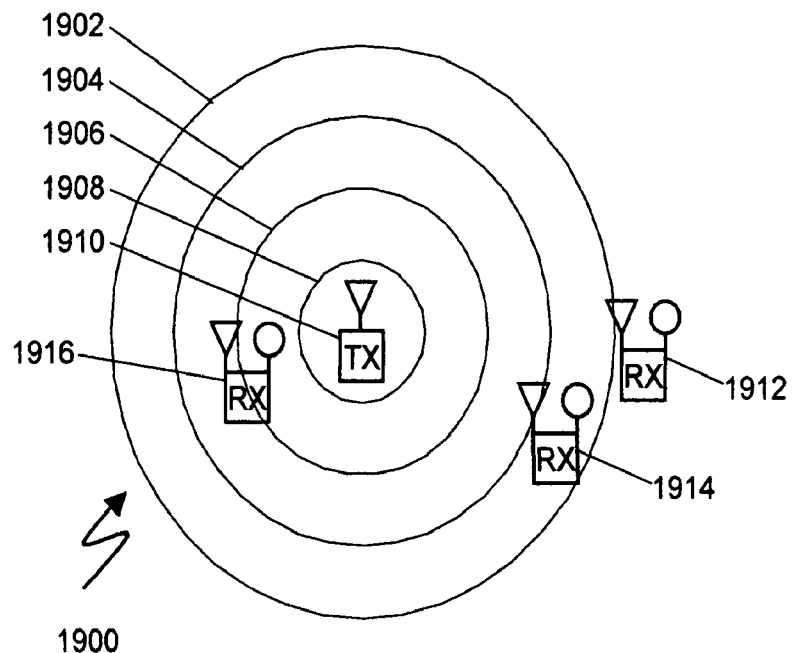
FIG. 19 is a schematic diagram illustrating the uniform variation of near field comparisons in an open field environment.

Near field electromagnetic ranging uses comparisons between two or more near field signal characteristics that vary in a predictable way with respect to distance or position. As explained in applicant's earlier co-pending work on near field electromagnetic ranging, one particularly useful comparison is between electric and magnetic field phase. This phase delta between electric and magnetic phase varies in a non-linear but predictable fashion within the near field. About a small electric antenna (small relative to ¼ wavelength), for instance, the phase delta varies with range, but does not vary with respect to angle, such as azimuth angle. FIG. 19 is a schematic diagram illustrating the uniform variation of near field comparisons in an open field environment. In a typical open near field propagation environment 1900, the magnitudes of near field comparisons form uniform circular contours 1902-1908 around a transmitter 1910 (Antennas are shown co-located with the transmitters and receivers), i.e. the near field comparison magnitude shown in FIG. 19 varies with range from the transmitter, but is the same value for any angle, such as azimuth angle, about the center transmitter. Receivers within a near field range of transmitter 1910 such as receivers 1912-1916 detect near field signals, effect a comparison between two or more near field signal properties, and locate transmitter 1910. Such near field properties may include but are not limited to electric field intensity, and magnetic field intensity. Comparisons may include but are not limited to relative phase angles and amplitudes.

Figure 20:
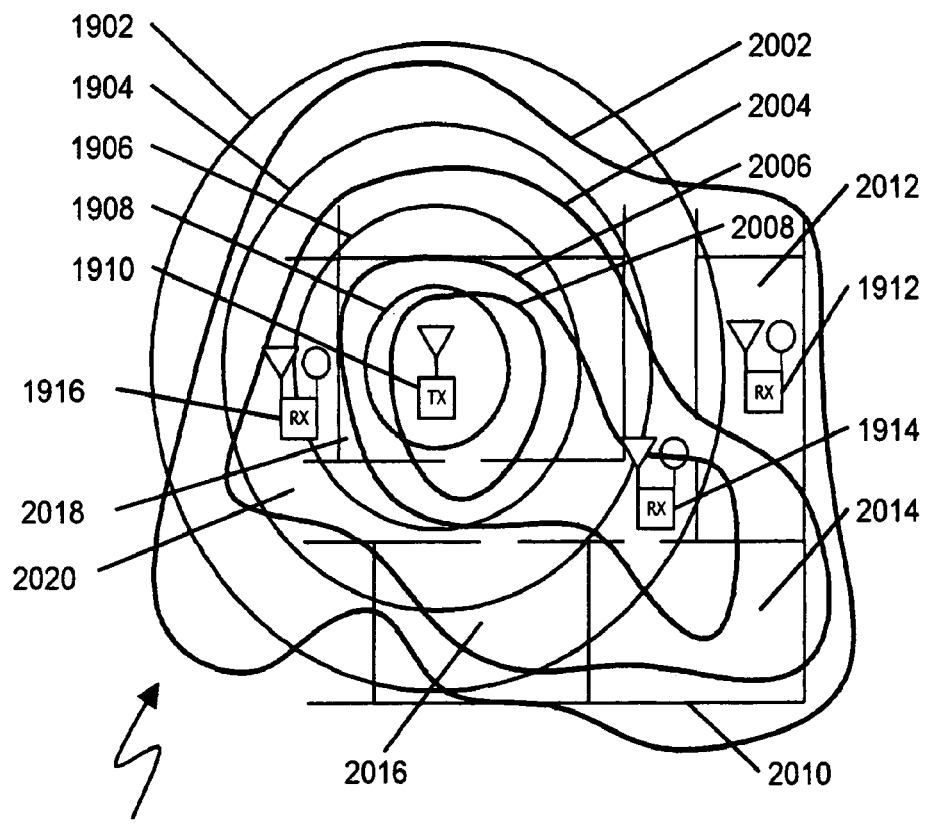
FIG. 20 is a schematic diagram depicting the distortions of near field comparisons in a cluttered and complicated propagation environment.

FIG. 20 is a schematic diagram depicting the distortions of near field comparisons in a cluttered and complicated propagation environment. In a typical cluttered near field propagation environment 2000, the magnitudes of near field comparisons no longer form uniform circular contours 1902-1908 around a transmitter 1910. Consider a typical propagation environment such as office environment 2010. Office environment 2010 comprises offices 2012-2018 and a hallway 2020. In the presence of office environment 2010, the magnitudes of near field comparisons form distorted contours 2002-2008. Although distorted contours 2002-2008 vary slowly enough to enable ready correlation between a magnitude of a near field comparison and a position, distorted contours 2002-2008 no longer vary uniformly with respect to angle. Thus, if a near field electromagnetic ranging system were to operate in a typical cluttered near field propagation environment 2000, a system and method for calibration of a near field electromagnetic ranging system offers the potential for improved accuracy.

FIG. 20 depicts office environment 2010 as an example of a typical cluttered propagation environment. Similar behavior occurs in home and residential environments, business, retail, and industrial environments, and in the complicated propagation environment between and around stacked shipping containers just to name a few. Office environment 2010 is an illustrative example. Nothing herein should be interpreted so as to limit application of the present invention to any particular environment.

Near Field Electromagnetic Positioning System Using Calibration Data

Figure 21:
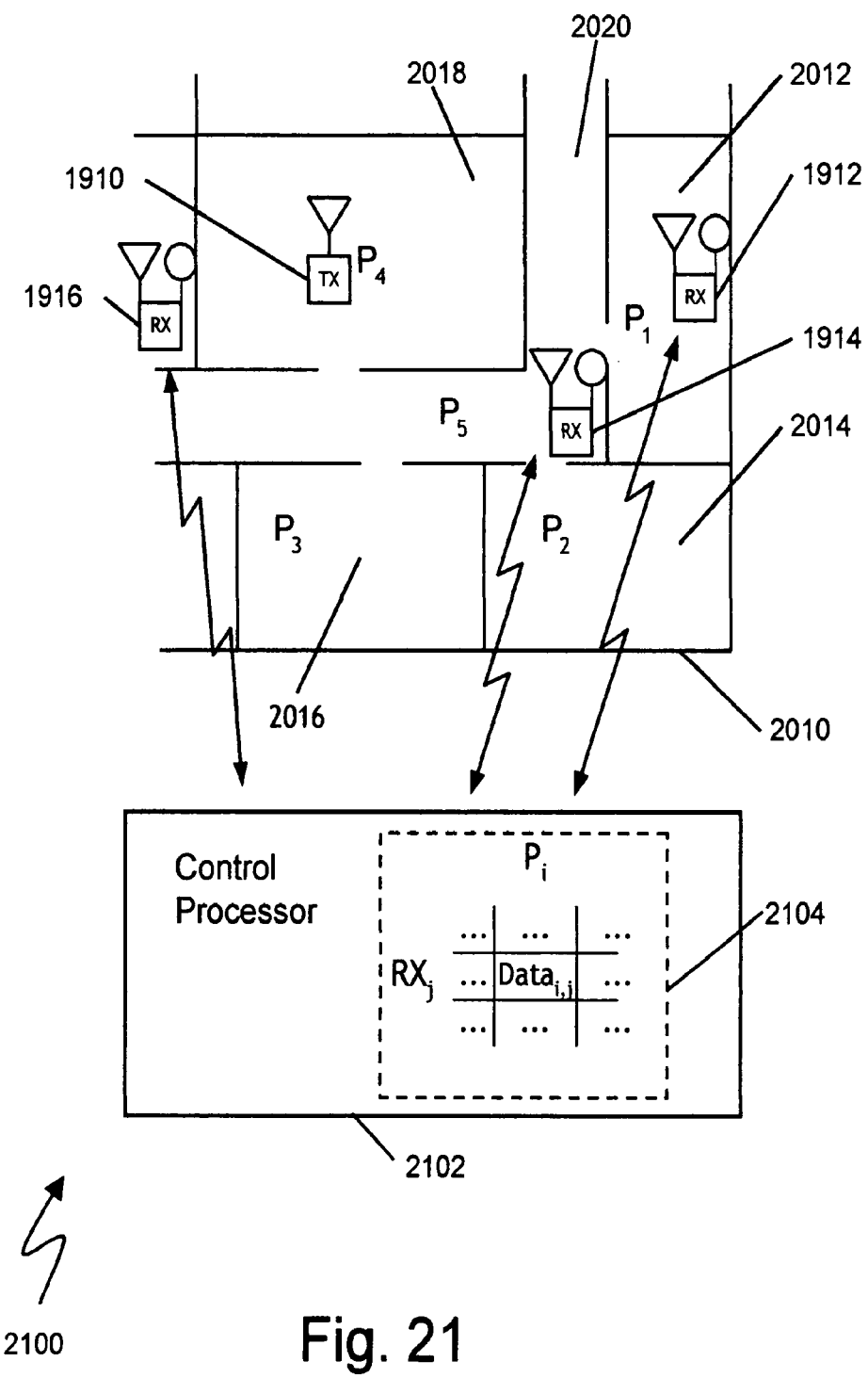
FIG. 21 is a schematic diagram showing how a near field electromagnetic ranging system may be calibrated by moving a reference transmitter to various points of interest within a cluttered and complicated propagation environment.

FIG. 21 is a schematic diagram showing how a near field electromagnetic ranging system may be calibrated by moving a reference transmitter to a sampling of points within a cluttered and complicated propagation environment. In FIG. 21, a calibration system 2100 operates in a typical cluttered environment 2000. Typical cluttered environment 2000 comprises an exemplary office environment 2010 which comprises a first office 2012, a second office 2014, a third office 2016, a fourth office 2018, and a hallway 2020.

A reference transmitter 1910 is moved to various points $P_1$-$P_5$ within the office environment 2010. Although five points are shown in exemplary calibration system 2100, in practice as many points as are necessary may be employed to achieve a desired level of precision. At each point, receivers 1912-1916 (also referred to as $RX_1$-$RX_3$) detect the near field beacon signals, effect a comparison between two or more near field signal properties, collect reference data regarding a magnitude of a near field comparison, and convey data to a control processor such as central controller 2102. One skilled in the data processing and computational arts will realize that a wide variety of data structures and processing methods are possible within the bounds of the present invention. One embodiment preferred in many applications is for a central controller 2102 to store a calibration set of measurements, which may also be called reference data, in a matrix 2104. The matrix 2104 stores reference data corresponding to measurements made by each receiver ($RX_j$) as the reference transmitter 1910 is moved to each point $P_1$-$P_5$ ($P_i$). The matrix of reference data may also be referred to as a database. The database may be recorded on media or transmitted by network to make the data available at a later time or to additional users.

One skilled in the art will appreciate that the comparison may be performed by direct comparison of signals or by measurement of signals and comparison of measured values. The comparison may be done in the receiver or may be done in a separate processing unit. Likewise the comparison may be performed at the time of reception or at a later time. Thus, a comparison unit refers to any device or system that performs the comparison, either by analog or digital signal processing or by software processing.

Two illustrative examples of the calibration process follow in a later section.

Method of Calibrating a Near Field Electromagnetic Positioning System

Figure 22:
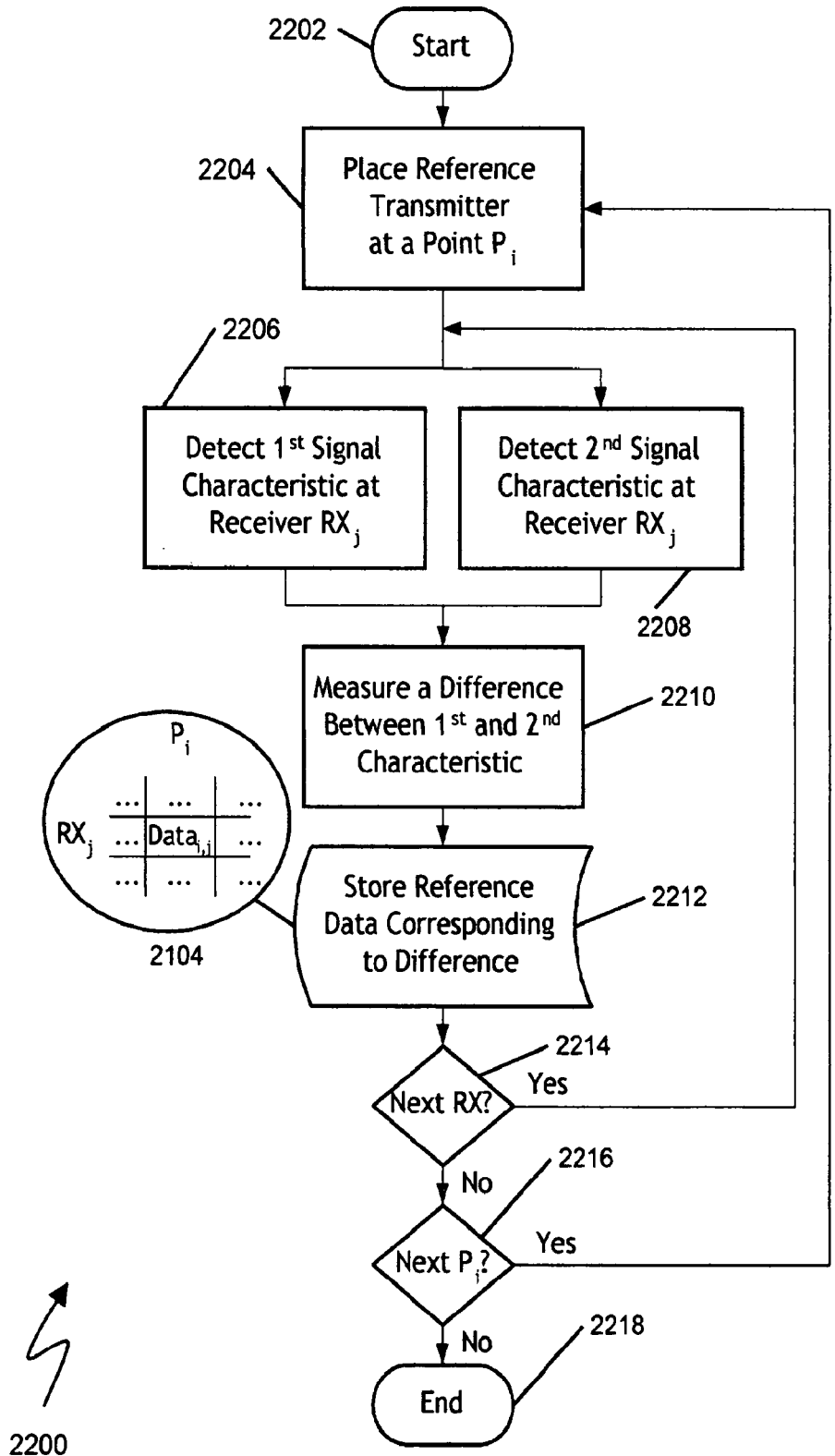
FIG. 22 is a flow diagram illustrating a calibration method for a near field electromagnetic ranging system.

FIG. 22 is a flow diagram illustrating a calibration method for a near field electromagnetic ranging system. Calibration method 2200 begins at a start block 2202. Calibration method 2200 continues with a reference transmitter placed at a point $P_i$ as indicated by block 2204. Calibration method 2200 continues with (in no particular order) (1) detecting a first signal characteristic at receiver $RX_j$ as indicated by block 2206, and (2) detecting a second signal characteristic at receiver $RX_j$ as indicated by block 2208. Calibration method 2200 continues with measuring a difference between the first and second characteristic as indicated by block 2210. Calibration method 2200 continues with storing reference data (calibration data) corresponding to the difference as indicated in block 2212. For instance, this storage may be effected by the receiver $RX_j$ conveying reference data to the central controller 2102 for storage in the data matrix 2214 (database 2214). Calibration method 2200 continues with a decision whether to proceed to the next receiver as indicated in block 2216. If more receivers remain to be processed, the method continues after block 2204 to collect reference data from another receiver. If all receivers have provided data then calibration method 2200 continues with a decision whether to proceed to move a reference transmitter to another point. If yes, calibration method 2200 continues at block 2204 to place the reference transmitter at another point. If no, calibration method 2200 terminates at termination block 2220.

Although exemplary calibration method 2200 shows a particular process chosen for ease of explanation, alternate equivalent processes may accomplish the same desired end result. For instance, although calibration method 2200 shows each receiver detecting, measuring and storing reference data in series, there is no reason why different receivers could not act substantially in parallel, simultaneously making measurements and conveying reference data for storage.

Near Field Electromagnetic Positioning Method Using Calibration Data

Figure 23:
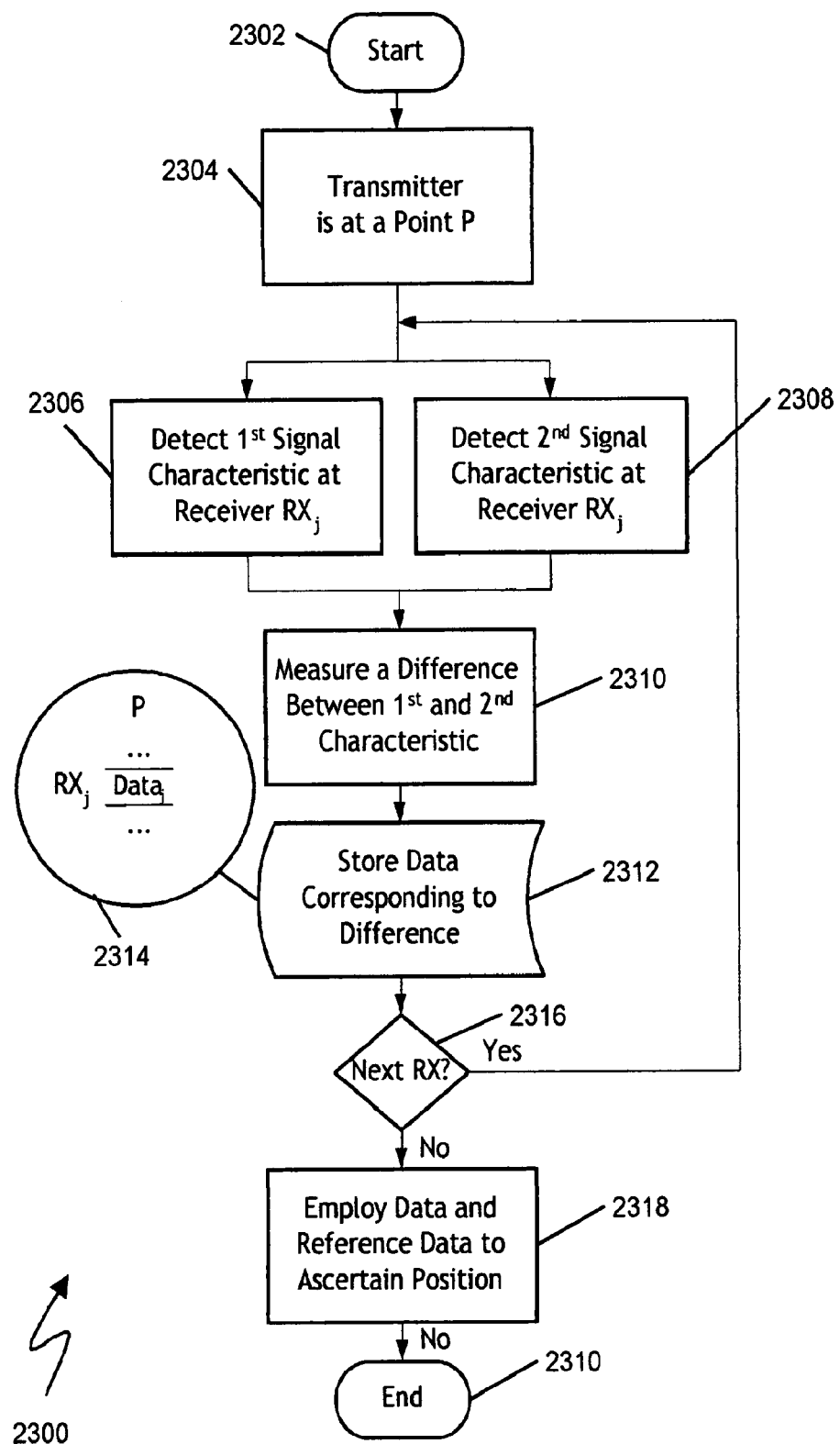
FIG. 23 is a flow diagram illustrating a method whereby reference data may be used in conjunction with a near field electromagnetic ranging system to ascertain a position.

FIG. 23 is a flow diagram illustrating a method whereby reference data may be used in conjunction with a near field electromagnetic ranging system to ascertain a position. The method 2300 for calibrated near field electromagnetic ranging begins at a start block 2302. Method 2300 continues with the transmitter at a point P as indicated by block 2304. Method 2300 continues with (in no particular order) (1) detecting a first signal characteristic at receiver $RX_j$ as indicated by block 2306, and (2) detecting a second signal characteristic at receiver $RX_j$ as indicated by block 2308. Method 2300 continues with measuring a difference between the first and second characteristic as indicated by block 2310. Method 2300 continues with storing data corresponding to the difference as indicated in block 2312. For instance, this storage may be effected by the receiver $RX_j$ conveying data to a central controller 2104 for storage in a transmitter position data vector 2314. Method 2300 continues with a decision whether to proceed to the next receiver as indicated in block 2316. If more receivers remain to be heard from, the method continues after block 2304 to collect data from another receiver. If all receivers have been heard from then method 2300 continues by employing data and reference data to calculate the position as indicated by block 2318. Method 2300 terminates at termination block 2320.

Although method 2300 shows one exemplary process, alternate equivalent processes may accomplish the same end result. For instance, although method 2300 shows each receiver detecting, measuring and storing data in series, there is no reason why different receivers could not act substantially in parallel, simultaneously making measurements and conveying data for analysis.

Near Field Electromagnetic Positioning System Using Calibration Data

Figure 24:
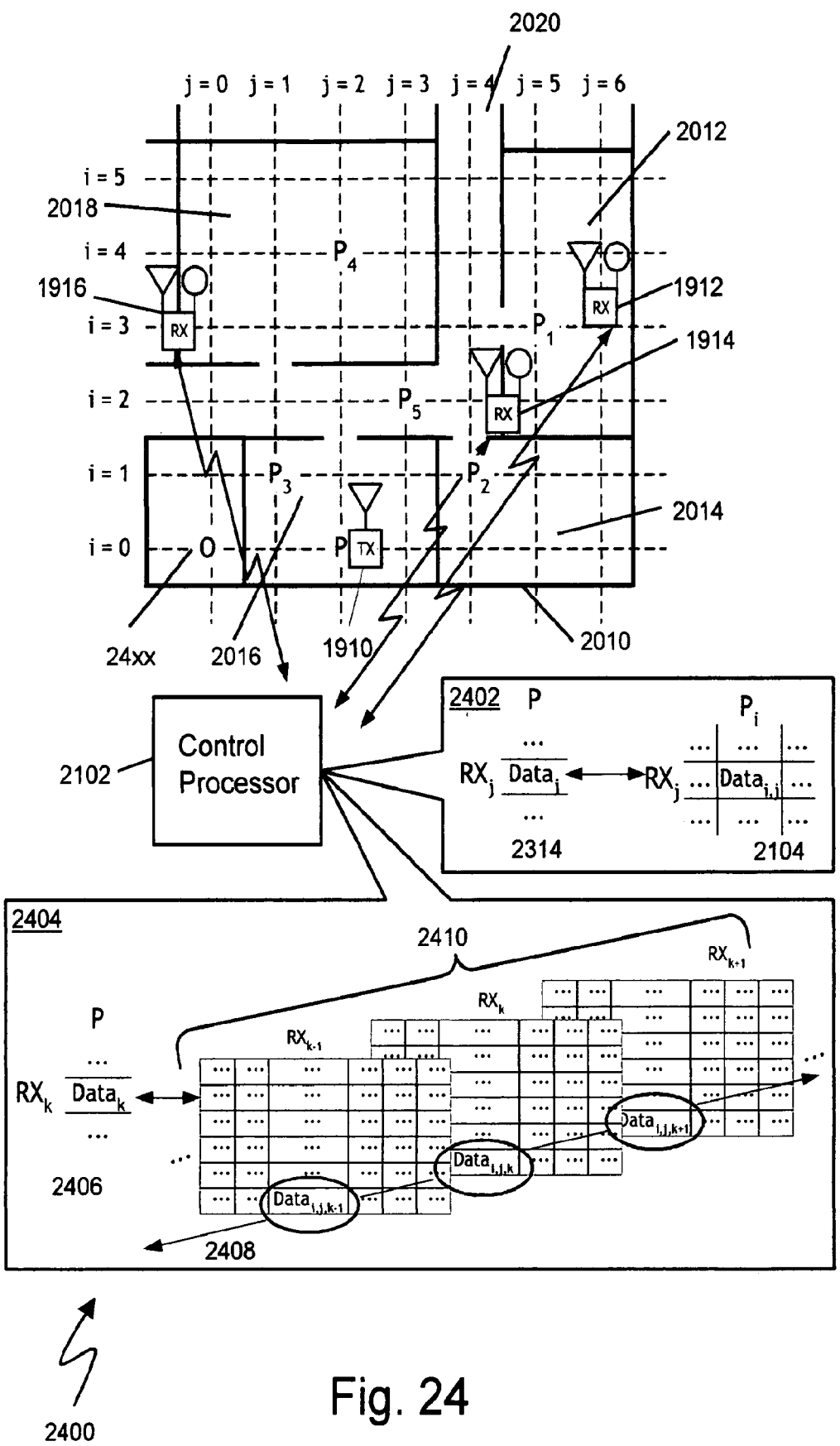
FIG. 24 is a schematic diagram showing a calibrated near field electromagnetic ranging system correcting for distortions in propagation by comparing measured data to reference data.

FIG. 24 is a schematic diagram showing a calibrated near field electromagnetic ranging system correcting for distortions in propagation by comparing measured to reference data. In FIG. 24, a calibrated near field electromagnetic ranging system 2400 operates in a typical cluttered environment 2000. The transmitter 1910 is located at a point P within the typical cluttered environment 2000. Receivers 1912-1916 detect near field signals, effect a comparison between two or more near field signal properties, collect data regarding the magnitude of the near field comparison, and convey data to the central controller 2402. One skilled in the data processing and computational arts will realize that a wide variety of data structures and processing methods are possible within the bounds of the present invention. Two particularly straightforward yet informative illustrative examples follow.

First Illustrative Example

In one exemplary embodiment, a central controller 2402 stores transmitter position data in a transmitter position data vector 2314. The transmitter position data vector 2314 contains data from each receiver 1912-1916 pertinent to the location of a transmitter 1910. The central controller 2402 employs transmitter position data vector 2314 and reference data 2104 to predict a position for transmitter 1910 in a position calculation.

For instance, suppose method 2300 of FIG. 23 for calibrated near field electromagnetic ranging yields the following exemplary transmitter position data vector 2314:

|  | Data: |
|---|---|
| RX #1: | 64 |
| RX #2: | 76 |
| RX #3: | 66 |

Further suppose that a calibration process such as calibration process 2200 of FIG. 22 results in exemplary reference data 2104 in the following table.

| | Point: | | | | |
|---|---|---|---|---|---|
| | $P_1$ | $P_2$ | $P_3$ | $P_4$ | $P_5$ |
| RX #1 | 89 | 75 | 54 | 57 | 78 |
| RX #2 | 85 | 87 | 68 | 62 | 88 |
| RX #3 | 42 | 49 | 76 | 80 | 62 |

In a first exemplary position calculation, a mean error magnitude may be calculated for each of the calibration points $P_1$-$P_5$ resulting in: 19.3, 12.9, 9.4, 11.7, and 9.9 respectively given exemplary transmitter position data vector 2314 and exemplary reference data 2104. Point $P_3$ has a minimal associated mean error magnitude, so first exemplary position calculation yields a position $P_3$ for transmitter 1910 located at point P.

Second Illustrative Example

In a second exemplary embodiment, the central controller 2102 stores transmitter position data in an exemplary transmitter position data vector 2406. Exemplary transmitter position data vector 2406 contains data from each receiver 1912-1016 pertinent to the location of the transmitter 1910. The central controller 2102 employs transmitter position data vector 2406 and reference data 2410 to predict a position for transmitter 1910 in a position calculation 2404.

For instance, suppose method 2300 of FIG. 23 for calibrated near field electromagnetic ranging yields an exemplary transmitter position data vector 2406 identical to exemplary transmitter position data vector 2314 defined above. Further suppose that a calibration process such as calibration process 2200 of FIG. 22 results in exemplary reference data identical to exemplary reference data 2406 defined above. Finally, consider a coordinate system 2401 in which positions are quantized by (i, j) values. An origin is defined at (i, j)=(0, 0). Points $P_1$-$P_5$ are located at (3, 5), (1, 4), (1, 1), (4, 2), and (2, 3) respectively. Transmitter 24010 is located at a point P located at (0, 2).

Using exemplary reference data 2406 defined above, exemplary position calculation 2404 requires generation of exemplary reference data 2410. In this particular illustrative example, assume that a central controller 2102 predicts a measurement result for each of the points in coordinate system 2401 based on the reference results obtained at points $P_1$-$P_5$. One exemplary illustrative calculation is to assume that a measurement results at a particular point is an average of measurement results at adjacent points. Thus:

$$\text{Data}_{ij} = \frac{1}{4}(\text{Data}_{i+1,j+1} + \text{Data}_{i-1,j+1} + \text{Data}_{i-1,j-1} + \text{Data}_{i+1,j-1}).$$

At edges of coordinate system 2401 a data point is assumed to be the average of the three adjacent data points. At corners of coordinate system 2401 a data point is assumed to be the average of the two adjacent data points. This algorithm is known in prior art and provides numerical solutions to Laplace's equation ($\nabla^2 \Phi = \partial^2 \Phi / \partial x^2 + \partial^2 \Phi / \partial y^2 = 0$) which describes (among other things) electrostatic potentials in a two dimensional context [Ref: John Artley, *Fields and Configurations*, (New York: Holt, Rinehart and Winston, Inc., 1965) pp. 167-175]. Iteratively applying this algorithm in the present example yields results for each of three receivers:

| i = | j = 0 | 1 | 2 | 3 | 4 | 5 | 6 |
|---|---|---|---|---|---|---|---|
| 5 | 60 | 61 | 62 | 68 | 74 | 79 | 80 |
| 4 | 60 | 60 | 57 | 68 | 76 | 81 | 82 |
| 3 | 60 | 61 | 64 | 72 | 79 | 89 | 84 |
| 2 | 59 | 60 | 67 | 78 | 78 | 82 | 82 |
| 1 | 57 | 54 | 64 | 72 | 75 | 78 | 79 |
| 0 | 58 | 59 | 64 | 70 | 74 | 77 | 78 | for first receiver 1912,

| I = | j = 0 | 1 | 2 | 3 | 4 | 5 | 6 |
|---|---|---|---|---|---|---|---|
| 5 | 67 | 67 | 67 | 72 | 76 | 79 | 81 |
| 4 | 68 | 67 | 62 | 73 | 78 | 81 | 82 |
| 3 | 69 | 70 | 72 | 79 | 82 | 85 | 84 |
| 2 | 70 | 71 | 77 | 88 | 85 | 85 | 85 |
| 1 | 69 | 68 | 76 | 83 | 87 | 86 | 85 |
| 0 | 71 | 72 | 76 | 81 | 84 | 85 | 85 | for second receiver 1914, and

| i = | j = 0 | 1 | 2 | 3 | 4 | 5 | 6 |
|---|---|---|---|---|---|---|---|
| 5 | 75 | 75 | 74 | 67 | 60 | 54 | 52 |
| 4 | 75 | 76 | 80 | 67 | 58 | 51 | 50 |
| 3 | 74 | 74 | 71 | 64 | 54 | 42 | 47 |
| 2 | 74 | 73 | 69 | 62 | 53 | 48 | 48 |
| 1 | 74 | 76 | 68 | 60 | 49 | 49 | 49 |
| 0 | 73 | 72 | 66 | 60 | 53 | 51 | 50 | for third receiver 1916. Thus reference data 2410 is not necessarily limited to measured reference data like reference data 2404, and may include additional interpolated or derived results. Measured exemplary reference data 2404 is shown in the three tables that comprise exemplary reference data 2410 by means of a larger font size, bold font, and underlining.

Finally, central controller 2102 finds data vector 2406 through reference data 2410 so as to minimize mean error magnitude. In the present example, mean error magnitude for each position is:

| i = | j = 0 | 1 | 2 | 3 | 4 | 5 | 6 |
|---|---|---|---|---|---|---|---|
| 5 | 7.2 | 7.2 | 6.4 | 2.9 | 5.5 | 9.8 | 11.5 |
| 4 | 7.2 | 8.0 | 11.7 | 2.8 | 7.1 | 12.3 | 13.2 |
| 3 | 6.5 | 5.8 | 3.3 | 4.3 | 10.7 | 19.3 | 15.7 |
| 2 | 6.4 | 5.3 | 1.6 | 9.9 | 12.1 | 14.9 | 14.8 |
| 1 | 7.4 | 9.4 | 0.5 | 7.0 | 12.9 | 13.5 | 13.8 |
| 0 | 6.3 | 5.2 | 0.0 | 5.8 | 10.3 | 12.3 | 13.0 |

So central controller 2102 concludes that a data vector 2410 through point P with coordinates (i, j)=(0, 2) has minimal error and is the position of transmitter 1910.

Exemplary position calculation 2404 may yield adequate results with sufficient measurement points, particularly if those points adequately bound an area of interest, like those points in coordinate system 2401. Also, exemplary position calculation 2404 is memory intensive yet relatively simple in calculation. Thus exemplary position calculation 2404 is well suited for a central controller 2104 with extensive memory and an ability to quickly compare data vectors. Alternate algorithms may be preferable for a central controller 2104 with differing capabilities.

Alternate Algorithms

Exemplary position calculation 2402 and exemplary position calculation 2404 are quantized to a finite number of points in coordinate system 2497. In alternate embodiments central controller 2102 may interpolate between calculated points to achieve a higher degree of precision.

For purpose of illustration and not limitation the present disclosure speaks to tracking a mobile transmitter (beacon) using a network of receivers (locators): a fixed locator-mobile beacon architecture. Alternatively, the system may comprise a fixed beacon-mobile locator architecture, a fixed/mobile locator-mobile beacon architecture, or a reciprocal beacon-locator architecture, i.e. multiple beacons with a single locator.

One skilled in the art will recognize the value in combining the present invention with other techniques to further refine the position result. For example, Bayesian, maximum likelihood, Kalman, and related techniques may be used to combine multiple range results based on known patterns of noise or uncertainty. Such techniques may also be used in combination with the present invention to better determine object position and motion states. The data that may be combined with near field position information may include such data as signal strength, accelerometer data, or inertial navigation states. Certainly, multiple position measurements may be used to determine the velocity and acceleration of an object.

Plug-in Receiver

Figure 25:
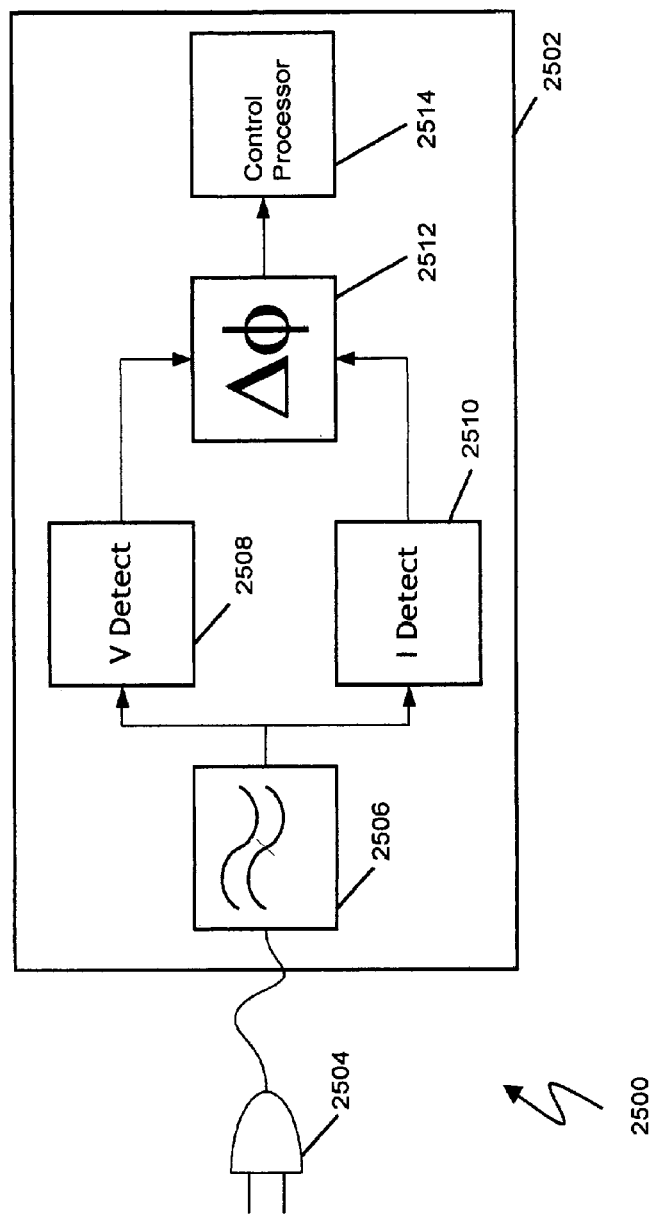
FIG. 25 is a schematic diagram presenting a plug-in receiver for use with a calibrated near field electromagnetic ranging system.

FIG. 25 is a schematic diagram presenting a plug-in receiver for use with a calibrated near field electromagnetic ranging system. A plug-in receiver 2500 uses existing electrical wiring in a typical building or other environment as an antenna or sensor to detect near field signal characteristics. Near field signals in a cluttered environment couple to electrical wiring with properties that are dependent upon where a near field transmitter is located. Thus, by comparing signal characteristics of voltage and current signals, it is possible to effect a position measurement. One preferred embodiment compares the phase of a voltage signal to the phase of a current signal. Alternatively, the comparison may be between the amplitude of the voltage signal and the amplitude of the current signal, or between the magnitude of the voltage signal and the magnitude of the current signal. Alternatively, the phase comparison and the amplitude comparison may be made in combination.

Plug in receiver 2500 includes an electrical plug 2504 to couple and receive signals from existing electrical wiring in a propagation environment. The plug-in receiver may utilize any existing wiring including power wiring, telephone wiring, cable TV wiring, or other wiring. A filter 2506 selects only the RF near field signals of interest for positioning purposes. In one embodiment, the filter is a high pass filter. In an alternate embodiment, the filter may be a band pass filter. In still other embodiments, the filter 2506 may include a power supply that converts power from electrical plug 2504 into a form useful for supplying power to the plug-in receiver 2500.

Signals selected by the filter 2506 are conveyed to a first receiver such as voltage detector 2508 and a second receiver such as current detector 2510. The voltage detector 2508 and the current detector 2510 include such filtering, amplification, mixing, and other receiving functions as are necessary to receive signals. Also, the voltage detector 2508 and the current detector 2510 may include a common local oscillator to effect a frequency conversion of signals. Signals from the voltage detector 2508 and the current detector 2510 are conveyed to a signal comparator 2512 that measures the difference between the voltage signal and the current signal. In a preferred embodiment, this comparison is a phase comparison between the voltage signal and the current signal. The signal comparator 2512 conveys the result of the comparison measurement to a microprocessor. The comparison measurement result may subsequently be transmitted to a central controller as part of an overall system for calibrated near field electromagnetic ranging. Transmission to the central controller may be implemented by a wired medium or a wireless medium. In particular, transmission to the central controller may involve signals coupled through the electrical plug 2504.

In one embodiment, plug-in receiver 2500 measures RF power factor, which is related to the cosine of the phase difference between the RF voltage and RF current. Alternative systems may be employed that measure RF power factor or relative phase between the RF voltage and RF current.

Antennas for a Personal Transmitter

One challenge faced by a near field radio system is to maximize an antenna's dimension so as to maximize its radiation efficiency. Thus a near field antenna benefits by being as large as feasible given mechanical constraints imposed by a given application.

Figures 26, 27:
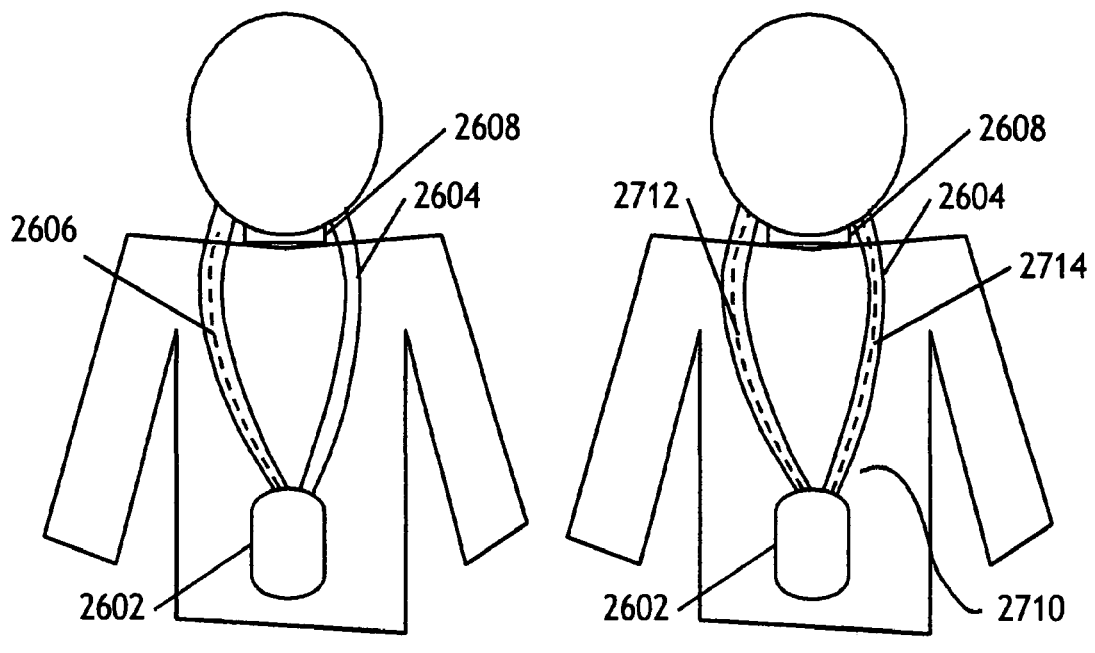
FIG. 26 provides a schematic diagram of a preferred embodiment of a personal transmitter and antenna for use in a personnel tracking system.
FIG. 27 shows a schematic diagram of a personal transmitter and a first alternate embodiment antenna for use in a personnel tracking system.

FIG. 26 provides schematic diagram 2600 of a preferred embodiment of a personal transmitter 2602 and an antenna 2606 for use in a personnel tracking system. The present invention teaches embedding thin wire antenna 2606 in lanyard 2604 in conjunction with personal transmitter 2602. Lanyard 2604 fits comfortably around neck 2608. Thin wire antenna 2606 may be a single strand, a Litz wire, or other conducting material suitable for integration with lanyard 2604.

FIG. 27 shows a schematic diagram 2700 of a personal transmitter 2602 and a first alternate embodiment antenna system 2710 for use in a personnel tracking system. First alternate embodiment antenna system 2710 includes a first element 2712 and a second element 2714. First element 2712 and second element 2714 are not connected behind neck 2608 and thus cooperate to form a V-dipole antenna. In yet another alternate embodiment, first element 2712 and second element 2714 are connected behind neck 2608 and thus cooperate to form a loop antenna. In a still further embodiment, first element 2712 and second element 2714 comprise multiple strands and are connected behind neck 2608 so as to cooperate to form a multi-turn loop antenna.

Figure 28:
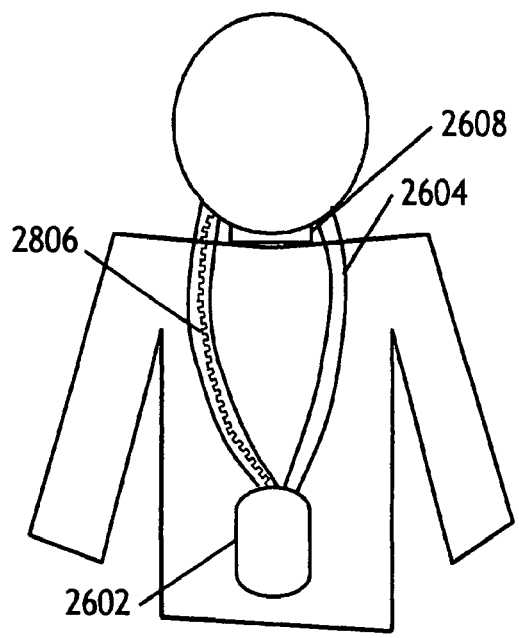
FIG. 28 provides a schematic diagram of a personal transmitter and a second alternate embodiment antenna for use in a personnel tracking system.

FIG. 28 provides a schematic diagram 2800 of a personal transmitter 2602 and a second alternate embodiment antenna 2806 for use in a personnel tracking system. Second alternate embodiment antenna 2806 is embedded in lanyard 2604 in conjunction with personal transmitter 2602. Lanyard 2604 fits comfortably around neck 2608. Second alternate embodiment antenna 2806 is a high reactance antenna structure. A high reactance antenna includes capacitive and/or inductive loading so as to increase apparent electrical length while retaining a compact physical form factor. Examples of a high reactance antenna structure include a meander line antenna, a helical antenna, or a thin plate antenna.

Specific applications have been presented solely for purposes of illustration to aid the reader in understanding a few of the great many contexts in which the present invention will prove useful. It should also be understood that, while the detailed drawings and specific examples given describe preferred embodiments of the invention, they are for purposes of illustration only, that the system and method of the present invention are not limited to the precise details and conditions disclosed and that various changes may be made therein without departing from the spirit of the invention which is defined by the following claims:

We claim:

1. A system for determining a distance between a first locus and a second locus, the system comprising:
 a beacon device comprising a transmitter and at least one transmitting antenna; and
 a locator device comprising a receiver and at least one receiving antenna;
 said beacon device for disposition at said first locus and said locator device for disposition at said second locus; said beacon device configured for transmitting an electromagnetic signal and said locator device configured for receiving said electromagnetic signal from said beacon device; said locator device configured for detecting at least two characteristics of said electromagnetic signal transmitted by said beacon device from said first locus and received by said locator device at said second locus when said second locus is within a near field distance from said first locus; and
 said locator device further comprising a processor, said processor configured for employing said at least two characteristics to effect said determining of said distance in accordance with a predefined relationship between said at least two characteristics and said distance.

2. The system as recited in claim 1, wherein said at least two characteristics of said electromagnetic signal comprise a first characteristic related to an electric field component of said electromagnetic signal and a second characteristic related to a magnetic field component of said electromagnetic signal.

3. The system as recited in claim 2, wherein said first characteristic is electric field phase and said second characteristic is magnetic field phase.

4. A system for measuring a distance between a first locus and a second locus, the system comprising:
 a locator device comprising a receiver and at least one receiving antenna, said locator device for disposition at said second locus, said locator device configured for receiving an electromagnetic signal from a beacon device, said beacon device situated at said first locus, said locator device configured for receiving at a distance from said beacon device within near-field range of said electromagnetic signal; said locator device configured for distinguishing at least two characteristics of said electromagnetic signal sensed by said locator device at said second locus when said locator device is within a near field range of said electromagnetic signal from said first locus; said system further comprising a processor, said processor configured for employing said at least two characteristics to effect said measuring in accordance with a predefined relationship between said at least two characteristics and said distance.

5. The system as recited in claim 4, wherein said at least two characteristics of said electromagnetic signal being a first characteristic related to an electric field component of said electromagnetic signal and a second characteristic related to a magnetic field component of said electromagnetic signal.

6. The system as recited in claim 5, wherein said first characteristic is electric field phase and said second characteristic is magnetic field phase.

7. The system as recited in claim 5, wherein said locator device effects said measuring by measuring a phase difference between said at least two characteristics of said electromagnetic signal and employing said phase difference to effect said measuring.

8. The system as recited in claim 4, wherein said locator device effects said measuring by measuring an amplitude difference between said at least two characteristics of said electromagnetic signal and employs said amplitude difference to effect said measuring.

9. A system for determining a position of a locus comprising:
a locator device comprising a receiver and at least one antenna, said locator device for disposition at said locus; said locator device configured for receiving an electromagnetic signal from a beacon device, said locator device configured for receiving at a distance from said beacon device within near field range of said electromagnetic signal; said locator device configured for distinguishing at least two characteristics of said electromagnetic signal sensed by said locator device at said locus; said system further comprising a processor, said processor configured for employing said at least two characteristics to effect said determining said position of said locus in accordance with a predefined calibration relationship between said at least two characteristics and position.

10. The system as recited in claim 9, wherein said at least two characteristics of said electromagnetic signal being a first characteristic related to an electric field component of said electromagnetic signal and a second characteristic related to a magnetic field component of said electromagnetic signal.

11. The system as recited in claim 10, wherein said first characteristic is electric field phase and said second characteristic is magnetic field phase.

12. The system as recited in claim 10, wherein said locator device effects said determining by measuring a phase difference between said at least two characteristics of said electromagnetic signal and employing said phase difference to effect said determining.

13. The system as recited in claim 9, wherein said locator device effects said determining by measuring an amplitude difference between said at least two characteristics of said electromagnetic signal and employs said amplitude difference to effect said determining.

14. The system in accordance with claim 9, wherein the beacon device is a mobile source of electromagnetic radiation.

15. The system in accordance with claim 9, wherein the beacon device operates from a fixed position.

16. The system in accordance with claim 9, wherein the beacon device is an uncooperative source of electromagnetic radiation.

17. The system in accordance with claim 9, further including a data link and a central controller, wherein said locator device conveys information relating to said at least two characteristics to said central controller using said data link.

18. The system in accordance with claim 9, further including a data link and a central controller, wherein said central controller conveys information to said locator device using said data link.

19. The system in accordance with claim 9, wherein the locator device is configured to be carried by a user and provide the user with location specific information.

20. The system in accordance with claim 19, wherein the location specific information relates to a nearby object.

21. The system in accordance with claim 20, wherein the nearby object is for sale, for review, or for evaluation.

22. The system in accordance with claim 20, wherein the location specific information relates to a price for said nearby object.

23. The system in accordance with claim 20, wherein the location specific information is descriptive information for the nearby object.

24. A method for determining distance between a first locus and a second locus, the method comprising the steps of:
(a) a receiving system receiving an electromagnetic signal at said second locus, said electromagnetic signal transmitted from said first locus, said second locus being within near field range of said electromagnetic signal from said first locus;
in no particular order:
(1) said receiving system detecting a first characteristic of said electromagnetic signal received at said second locus; and
(2) said receiving system detecting a second characteristic of said electromagnetic signal received at said second locus;
(b) said receiving system comparing said first characteristic and said second characteristic to produce a comparison; and
(c) said receiving system employing said comparison to determine said distance in accordance with a predefined calibration relationship between said comparison and said distance.

25. The method as recited in claim 24, wherein the receiving system is physically distributed and the step of employing said comparison to determine said distance is located at a third locus separate from said second locus.

26. The method as recited in claim 24, wherein said first characteristic is related to an electric field component of said electromagnetic signal and said second characteristic is related to a magnetic field component of said electromagnetic signal.

27. The method as recited in claim 26, wherein said first characteristic is electric field phase and said second characteristic is magnetic field phase.

28. The method as recited in claim 26, wherein said locator device effects said determining by measuring a phase difference between said first characteristic of said electromagnetic signal and said second characteristic of said electromagnetic signal and employing said phase difference to effect said determining.

29. A method for determining a location of a second locus, the method comprising the steps of:

(a) a receiving system receiving an electromagnetic signal at said second locus, said electromagnetic signal transmitted from said first locus, said second locus being within near field range of said electromagnetic signal from said first locus;

in no particular order:

(1) said receiving system detecting a first characteristic of said electromagnetic signal received at said second locus; and (2) said receiving system detecting a second characteristic of said electromagnetic signal received at said second locus;

(b) said receiving system comparing said first characteristic and said second characteristic to produce a comparison; and (c) said receiving system employing said comparison to determine said location in accordance with a predefined calibration relationship between said comparison and said location.

30. The method as recited in claim 29, wherein the receiving system is physically distributed and the step of employing said comparison to determine said location is located at a third locus separate from said second locus.

31. The method as recited in claim 29, wherein said first characteristic is related to an electric field component of said electromagnetic signal and said second characteristic is related to a magnetic field component of said electromagnetic signal.

32. The method as recited in claim 31, wherein said first characteristic is electric field phase and said second characteristic is magnetic field phase.

33. The method as recited in claim 31, wherein said locator device effects said determining by measuring a phase difference between said first characteristic of said electromagnetic signal and said second characteristic of said electromagnetic signal and employing said phase difference to effect said determining.

* * * * *